United States Patent
Wike et al.

(10) Patent No.: US 10,404,062 B2
(45) Date of Patent: Sep. 3, 2019

(54) FAULT-TOLERANT POWER-DISTRIBUTION MODULES FOR A POWER PLANT

(71) Applicant: NuScale Power, LLC, Corvallis, OR (US)

(72) Inventors: Hughes Wike, Corvallis, OR (US); Ted Hough, Corvallis, OR (US); Drummond Fudge, Corvallis, OR (US)

(73) Assignee: NUSCALE POWER, LLC, Corvallis, OR (US)

(*) Notice: Subject to any disclaimer, the term of this patent is extended or adjusted under 35 U.S.C. 154(b) by 528 days.

(21) Appl. No.: 15/135,324

(22) Filed: Apr. 21, 2016

(65) Prior Publication Data
US 2017/0310116 A1  Oct. 26, 2017

(51) Int. Cl.
*H02J 1/10* (2006.01)
*H02J 7/00* (2006.01)

(52) U.S. Cl.
CPC .............. *H02J 1/10* (2013.01); *H02J 7/0052* (2013.01)

(58) Field of Classification Search
CPC .................................. H02J 1/10; Y02E 30/40
See application file for complete search history.

(56) References Cited

U.S. PATENT DOCUMENTS

| | | | |
|---|---|---|---|
| 5,258,652 A | 11/1993 | Nigawara et al. .............. 307/38 |
| 5,621,776 A * | 4/1997 | Gaubatz ................. G21C 17/00 376/242 |
| 5,745,355 A * | 4/1998 | Tracy ......................... H02J 3/38 323/272 |
| 6,281,602 B1 * | 8/2001 | Got ............................ H02J 1/06 307/18 |
| 6,297,620 B1 * | 10/2001 | Goodrich, II ........... H02J 7/022 320/152 |

(Continued)

FOREIGN PATENT DOCUMENTS

| CN | 105319517 A | * | 2/2016 | ............. G01R 31/40 |
| JP | 2005227017 A | * | 8/2005 | ............... G21D 3/04 |
| WO | WO 2015091154 A1 | * | 6/2015 | ............... H02J 1/102 |

OTHER PUBLICATIONS

Pat Cluse, "Modern Topologies for D.C. UPS," May 2014, Eaton Corp., pp. 1-5.*

(Continued)

*Primary Examiner* — Pinping Sun
(74) *Attorney, Agent, or Firm* — Schwabe Williamson & Wyatt

(57) ABSTRACT

Embodiments are directed to fault-tolerant power-distribution modules (PDM). A PDM is included in a power plant to provide a portion of the power generated by the plant as a direct current (DC) signal for the operation of the plant. A power-distribution system distributes a portion of the power generated by the plant to one or more PDMs, as an alternating current (AC) signal. The PDMs provide electrical power to various plant loads. The plant loads may be related to the safety of the operation of the power plant. At least one of the plant loads is a non-safety related load. A PDM may be a DC power supply. The power plant may include one or more power-generating module (PGM) assemblies. At least one of the PGM assemblies may include a nuclear reactor. Accordingly, the power plant may be a modular nuclear power plant.

14 Claims, 9 Drawing Sheets

(56) References Cited

U.S. PATENT DOCUMENTS

| | | | | | |
|---|---|---|---|---|---|
| 6,630,750 | B2* | 10/2003 | McAndrews | | H02J 1/10 |
| | | | | | 307/64 |
| 8,736,233 | B2* | 5/2014 | Muramatsu | | H02M 7/17 |
| | | | | | 322/24 |
| 2009/0316310 | A1 | 12/2009 | Hill | | 361/2 |
| 2010/0026094 | A1* | 2/2010 | Kraus | | H02J 1/10 |
| | | | | | 307/29 |
| 2010/0260306 | A1* | 10/2010 | Hyde | | G21D 7/04 |
| | | | | | 376/299 |
| 2011/0187197 | A1* | 8/2011 | Moth | | H02J 9/062 |
| | | | | | 307/66 |
| 2011/0278934 | A1* | 11/2011 | Ghosh | | H02J 9/062 |
| | | | | | 307/66 |
| 2012/0043822 | A1* | 2/2012 | Swenson | | H02J 1/10 |
| | | | | | 307/82 |
| 2012/0181862 | A1 | 7/2012 | Gertmar | | 307/22 |
| 2012/0217810 | A1* | 8/2012 | Jagota | | H02J 1/10 |
| | | | | | 307/65 |
| 2012/0267953 | A1* | 10/2012 | Doyle | | H02M 1/44 |
| | | | | | 307/31 |
| 2013/0293017 | A1* | 11/2013 | Englert | | H02J 9/04 |
| | | | | | 307/65 |
| 2014/0001863 | A1* | 1/2014 | Zhang | | G21D 1/02 |
| | | | | | 307/66 |
| 2014/0117764 | A1* | 5/2014 | Navarro | | H02J 9/062 |
| | | | | | 307/64 |
| 2014/0152098 | A1* | 6/2014 | Hough | | G21D 1/00 |
| | | | | | 307/23 |
| 2015/0001942 | A1* | 1/2015 | Fang | | H02J 7/00 |
| | | | | | 307/64 |
| 2015/0036254 | A1* | 2/2015 | Emert | | H02J 9/06 |
| | | | | | 361/93.1 |
| 2015/0123473 | A1* | 5/2015 | Braylovskiy | | H02J 9/061 |
| | | | | | 307/23 |
| 2015/0180233 | A1* | 6/2015 | Yamada | | H02J 1/08 |
| | | | | | 307/23 |
| 2015/0200566 | A1* | 7/2015 | Huang | | G06F 1/3287 |
| | | | | | 307/64 |

OTHER PUBLICATIONS

Emerge Alliance, "380 Vdc architecture for the modern data center," pp. 1-29 (Year: 2013).*

Authorized Officer Hye Lyun Park, International Search Report and Written Opinion for International Application No. PCT/US2016/030068, dated Jan. 13, 2017, 9 pages.

* cited by examiner

FAULT-TOLERANT POWER-DISTRIBUTION MODULES FOR A POWER PLANT

GOVERNMENT INTEREST

This invention was made with Government support under Contract No. DE-NE0000633 awarded by the Department of Energy. The Government has certain rights in this invention.

FIELD OF THE INVENTION

The application relates to power distribution for a power plant and, more particularly but not exclusively, to redundant, fault-tolerant power-distribution modules that provide direct-current (DC) electrical power to various loads and safety-related systems of the power plant.

BACKGROUND OF THE INVENTION

Power plants, such as those that employ a nuclear reactor, generate electrical power. Most of the generated power is transmitted to remote consumers. However, a portion of the generated electrical power is locally distributed to the power plant. The locally distributed power is used to operate the plant and provide safety-related functionality. More specifically, the locally distributed power is used to power the various electrical, mechanical, and/or pneumatic/hydraulic systems that are needed to run and ensure the efficient and safe generation of power.

In conventional designs for nuclear reactor plants, locally distributed electrical power is required to perform safety-related functions under normal conditions and to safely shutdown various systems following a loss of alternating current (AC) power. Power plants may employ Class 1E direct current (DC) components and systems for such safety-related tasks. Such Class 1E DC systems are typically required to remain operational when the power plant is generating power. Accordingly, in conventional plant designs, maintaining Class 1E hardware, when the plant is generating power, may involve considerable risk to the plant and/or plant personnel. To ensure that safety-related functions remain operational when the plant is generating power and decrease risk to the plant personnel, best practices in conventional plant designs involve maintaining Class 1E hardware during plant outages. It is for these and other concerns that the following disclosure is provided.

SUMMARY OF THE INVENTION

Various embodiments are directed towards fault-tolerant direct current (DC) electrical power-distribution modules (PDM). PDMs provide DC power signals to various critical and non-critical plant loads within a power plant. The critical plant loads may include safety-related loads. Various embodiments of PDMs may be considered a non-Class 1E component. A PDM, as disclosed herein, reduces the likelihood of unintended triggering of a safety-related system actuation in the event of a loss of DC power. Accordingly, various embodiments of PDMs reduce the likelihood of the power plant experiencing a loss in DC power. The fault-tolerance enables flexibility to perform system maintenance activities, even when the power plant (and a PDM) is generating and/or providing electrical power. In a least one embodiment, a PDM supplies or provides a 125 V DC power signal to various module specific or common plant electrical loads.

In various embodiments, a PDM may be a module-specific PDM. In other embodiments, a PDM may be a common plant PDM. Both module-specific and common plant PDMs are fault-tolerant and include redundancy such that any component may be removed from service during normal plant operation and without loss of overall PDM function.

In various embodiments, a fault-tolerant PDM supplies electrical power, which is generated within a power plant, to plant loads within the power plant. The PDM may include inputs, a first DC bus, a second DC bus, a first channel, and a second channel. The inputs are coupled to alternating current (AC) busses of the power plant and provide an AC signal to the module. The first DC bus is coupled to a first load separation group (LSG) of the plant loads. The second DC bus is coupled to a second LSG of the plurality of plant loads.

When at least one of the AC busses provides the AC signal to the first channel, a first rectifier rectifies the AC signal and selectively provides a first DC signal to the first DC bus. The first DC signal includes a first portion of the rectified AC signal. When the AC busses do not provide the AC signal to the first channel, a first battery selectively provides the first DC signal to the first DC bus. The first DC signal includes energy stored in the first battery.

When at least one of the AC busses provide the AC signal to the second channel, a second rectifier rectifies the AC signal and selectively provides a second DC signal to the second DC bus. The second DC signal includes a second portion of the rectified AC signal. When the AC busses do not provide the AC signal to the second channel, a second battery selectively provides the second DC signal to the second DC bus. The second DC signal includes energy stored in the second battery.

In some embodiments, the module further includes a third DC bus, a fourth DC bus, a third channel, and a fourth channel. The third DC bus is coupled to a third LSG of the plant loads. The fourth DC bus is coupled to a fourth LSG of the plant loads. When at least one of the AC busses provides the AC signal to the third channel, a third rectifier rectifies the AC signal and selectively provides a third DC signal to the third DC bus. The third DC signal includes a third portion of the rectified AC signal. When the AC busses do not provide the AC signal to the third channel, a third battery selectively provides the third DC signal to the third DC bus. The third DC signal includes energy stored in the third battery.

When at least one of the AC busses provide the AC signal to the fourth channel, a fourth rectifier rectifies the AC signal and selectively provides a fourth DC signal to the fourth CD bus. The fourth DC signal includes a fourth portion of the rectified AC signal. When the AC busses do not provide the AC signal to the fourth channel, a fourth battery selectively provides the fourth DC signal to the fourth DC bus. The fourth DC signal includes energy stored in the fourth battery.

In at least one embodiment, when at least one of the AC busses provide the AC signal to the first channel, a third rectifier rectifies the AC signal and selectively provides a third DC signal to the first DC bus. The third DC signal includes a third rectified portion of the AC signal. When the plurality of AC busses do not provide the AC signal to the first channel, a third battery selectively provides the third DC signal to the first DC bus. The third DC signal includes energy stored in the third battery.

When at least one of the AC busses provide the AC signal to the second channel, a fourth rectifier rectifies the AC signal and selectively provides a fourth DC signal to the second DC bus. The fourth DC signal includes a fourth portion of the rectified AC signal. When the AC busses do not provide the AC signal to the second channel, a fourth battery selectively provides the fourth DC signal to the second DC bus. The fourth DC signal includes energy stored in the fourth battery.

In some embodiments, a capacity of the first battery enables the first battery to provide the first DC signal to the first LSG for at least 24 hours. A capacity of the second battery enables the second battery to provide the second DC signal to the second LSG for at least 24 hours. A capacity of the third battery enables the third battery to provide the third DC signal to the third LSG for at least 72 hours. A capacity of the fourth battery enables the fourth battery to provide the fourth DC signal to the fourth LSG for at least 72 hours.

In at least one embodiment, the first channel includes a first battery charger. When at least one of the AC busses provide the AC signal to the first channel, the first battery charger selectively charges the first battery and maintains a float voltage on the first battery. The second channel includes a second battery charger. When at least one of the plurality of AC busses provide the AC signal to the second channel, the second battery charger selectively charges the second battery and maintains the float voltage on the second battery.

In some embodiments, the module may further include a first switch and a second switch. The first switch selectively couples the first DC bus and the first battery. The second switch that selectively couples the second DC bus and the second battery. At least a portion of each of the first and the second DC busses may be included in one or more switchgear modules.

Some embodiments include a fault-tolerant system. The system locally provides electrical power generated in a power plant to the power plant. The system include AC inputs, a first channel, and a second channel. The AC inputs are each enabled to receive an AC signal. The first channel includes a first sub-system, a second sub-system, and a first DC bus. The second channel includes a third sub-system, a fourth sub-system, and a second DC bus.

In response to receiving the AC signal from at least one of the plurality of AC inputs, the first sub-system generates a first DC signal. In response to receiving the AC signal from the at least one of the plurality of AC inputs, the second sub-system generates a second DC signal. In response to receiving at least one of the first or the second DC signals from the first or the second sub-systems, the first DC bus provides the received first or the second DC signals to a first subset of the plant loads.

In response to receiving the AC signal from at least one of the plurality of AC inputs, the third sub-system generates a third DC signal. In response to receiving the AC signal from at least one of the plurality of AC inputs, the fourth sub-system generates a fourth DC signal. In response to receiving at least one of the third or the fourth DC signals from the third or the fourth sub-systems, the second DC bus provides the received third or the fourth DC signals to the first subset of the plant loads.

At least one embodiment includes a third channel and a fourth channel. The third channel includes a fifth sub-system, a sixth sub-system, and a third DC bus. The fourth channel includes a seventh sub-system, an eighth sub-system, and a fourth DC bus. In response to receiving the AC signal from at least one of the plurality of AC inputs, the fifth sub-system generates a fifth DC signal. In response to receiving the AC signal from at least one of the plurality of AC inputs, the sixth sub-system generates a sixth DC signal.

In response to receiving at least one of the fifth or the sixth DC signals from the fifth or the sixth sub-systems, the third DC bus provides the received fifth or the sixth DC signals to a second subset of the plant loads In response to receiving the AC signal from at least one of the plurality of AC inputs, the seventh sub-system generates a fourth DC signal. In response to receiving the AC signal from at least one of the AC inputs, the eighth sub-system generates an eighth DC signal. In response to receiving at least one of the seventh or the eighth DC signals from the seventh or the eighth sub-systems, the fourth DC bus provides the received seventh or the eighth DC signals to the second subset of the plurality of plant loads.

In various embodiments, the first sub-system of the first channel includes a first battery and a first charging module. The second sub-system of the first channel may include a second battery and a second charging module. In response to the first sub-system receiving the AC signal from the AC bus, the first charging module generates the first DC signal by converting at least a portion of the AC signal to the first DC signal. The first charging module employs a portion of the first DC signal to charge and maintain a float voltage on the first battery and provides another portion of the first DC signal to the first DC bus. In response to the second sub-system receiving the AC signal from the AC bus, the second charging module generates the second DC signal by converting at least a portion of the AC signal to the second DC signal. The second charging module also employs a portion of the second DC signal to charge and maintain a float voltage on the second battery, and provides another portion of the second DC signal to the first DC bus.

In at least one embodiment, in response to the first sub-system not receiving the AC signal from the AC bus, the first battery selectively generates the first DC signal and selectively provides the first DC signal to the first DC bus. In response to the second sub-system not receiving the AC signal from the AC bus, the second battery selectively generates the second DC signal and selectively provides the second DC signal to the first DC bus.

In various embodiments, the first sub-system of the first channel includes a first battery, a first charging module, and a first switch. The first switch selectively couples and decouples the first DC bus and the first battery. The second sub-system of the first channel includes a second battery, a second charging module, and a second switch. The second switch selectively couples and decouples the second DC bus and the second battery. A voltage of the AC signal may be approximately 480 V AC. A voltage of the first and the second DC signals may be approximately 125 V. The AC signal may be generated from heat generated by a nuclear reactor included in the power plant. The first subset of the plant loads is employed to operate the nuclear reactor. Furthermore, the second subset of the plan loads may be employed to operate the nuclear reactor.

Various embodiments include a fault-tolerant power supply that supplies direct current (DC) power to plants loads within a nuclear power plant. The power supply may include alternating current (AC) inputs and a first supply subdivision. A local distribution bus of the power plant provides one or more AC signals to the AC inputs. The first supply subdivision includes a first battery, a second battery, a first battery charger, a second battery charger, and a first DC bus. The first DC bus is enabled to provide a first DC signal to a first subset of the plant loads. When at least one of the AC inputs provides the AC signal to the first supply subdivision, at least one of the first or the second battery chargers employs the AC signal to at least provide the first DC signal to the first DC bus. When the AC inputs do not provide the AC signal to the first supply subdivision, at least one of the first or the second batteries selectively provides the first DC signal to the first DC bus.

Some embodiments of the power supply further include a first switch and a second switch. The first switch selectively couples and decouples at least one of the AC busses and the first battery charger. When the at least one of the AC busses and the first battery charger are coupled, the at least one of the AC busses is enabled to provide the AC signal to first battery charger. The first battery charger is enabled to employ the AC signal to provide the first DC signal to the first DC bus. The second switch selectively couples and decouples at least one of the AC busses and the second battery charger. When the at least one of the AC busses and the second battery charger are coupled, the at least one of the AC busses is enabled to provide the AC signal to second battery charger. The second battery charger is enabled to employ the AC signal to provide the first DC signal to the first DC bus.

In some embodiments, the power supply also includes a second supply division. The second supply subdivision includes a third battery, a fourth battery, a third battery charger, a fourth battery charger, and a second DC bus. The second DC bus is enabled to provide a second DC signal to the second subset of the plant loads. When at least one of the AC busses provides the AC signal to the second supply subdivision, at least one of the third or the fourth battery chargers employs the AC signal to at least provide the second DC signal to the second DC bus. When the AC busses do not provide the AC signal to the second supply division, at least one of the third or the fourth batteries selectively provides the second DC signal to the second DC bus.

Some embodiments of the power supply include a first switch and a second switch. The first switch selectively couples and decouples at least one of the AC busses and the first supply subdivision. When the at least one of the AC busses and the first supply subdivision are coupled, the at least one of the AC busses is enabled to provide the AC signal to at least one of the first or the second battery chargers. The at least one of the first or the second battery chargers is enabled to employ the AC signal to provide the first DC signal to the first DC bus. The second switch selectively couples and decouples at least one of the AC busses and the second supply subdivision. When the at least one of the AC busses and the second supply subdivision are coupled, the at least one of the AC busses is enabled to provide the AC signal to at least one of the third or the fourth battery charger. The at least one of the third or the fourth battery charger is enabled to employ the AC signal to provide the second DC signal to the second DC bus.

In other embodiments, the first switch selectively couples and decouples the first battery and the first battery charger. When the at least one of the AC busses provides the AC signal to the first supply subdivision and the first battery is coupled to the first battery charger, the first battery charger is enabled to at least charge the first battery or maintain a float voltage on the first battery. The second switch selectively couples and decouples the second battery and the second battery charger. When the at least one of the AC busses provides the AC signal to the second supply subdivision and the second battery is coupled to the second battery charger, the second battery charger is enabled to at least charge the battery or maintain the float voltage on the second battery. In at least one embodiment, the power supply further includes a second supply subdivision. The second supply division includes a third battery, a fourth battery, a third battery charger, a fourth battery charger, and a second DC bus.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
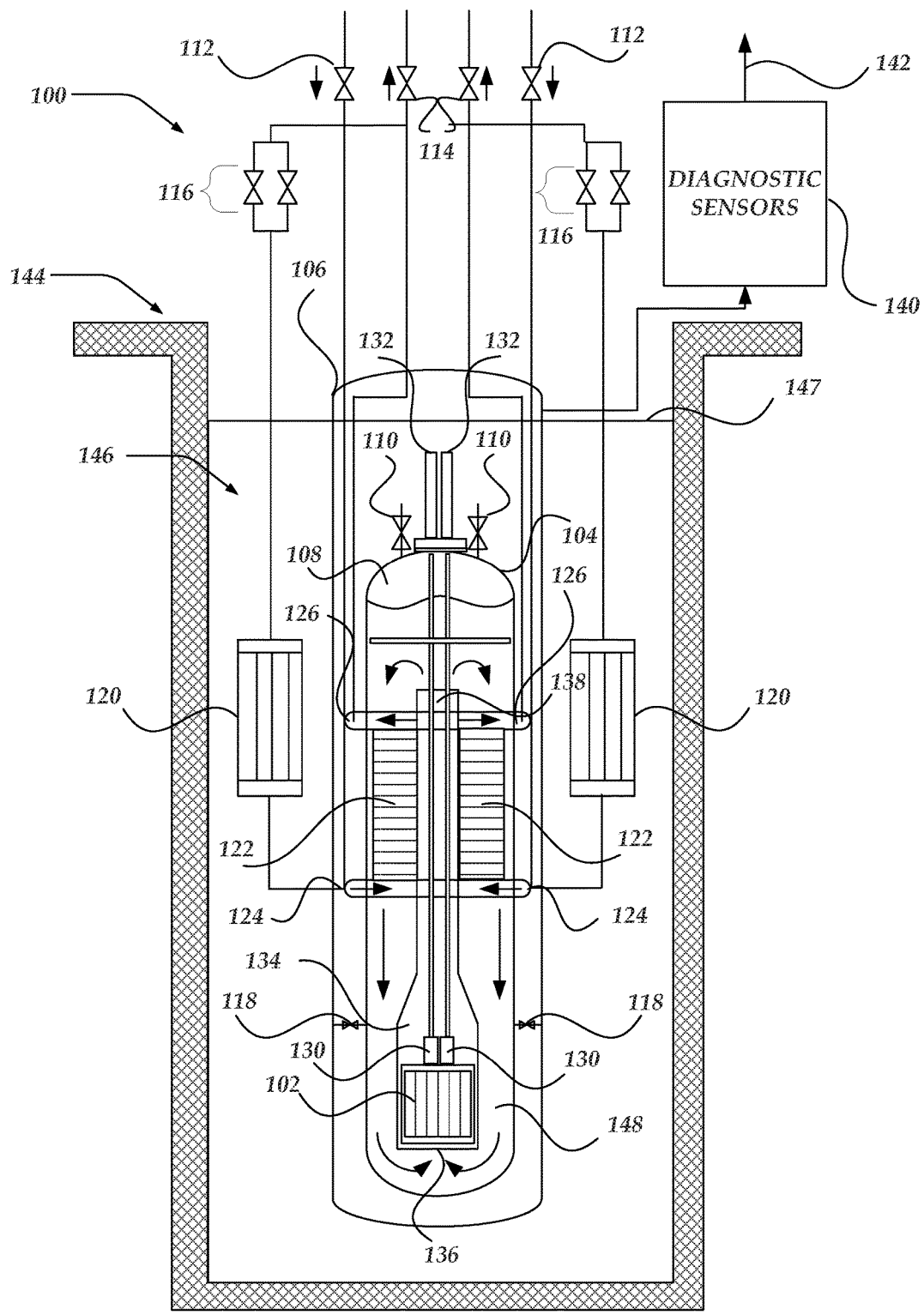
FIG. 1A provides a schematic view of a power-generating module assembly that is consistent with the various embodiments disclosed herein.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "switchgear" is used to indicate various electrical distribution components and/or hardware, such as but not limited to switches, fuses, and circuit breakers. A "switchgear module" is a module that includes a plurality of switchgear components and a switchgear module bus. A switchgear module may include one or more inputs electrically coupled to one or more outputs, via the switchgear module bus. As discussed throughout and shown in the various figures, various switchgear components, such as switches, circuit breakers, fuses, and such may be included in a switchgear module and intermediate the inputs and outputs of the switchgear module.

Briefly stated, embodiments are directed to fault-tolerant power-distribution modules (PDM). A PDM may be included in a modular power plant to provide a portion of the power generated by the plant as direct current (DC) electrical power for the operation of the plant. A fault-tolerant power-distribution system may distribute a portion of the power generated by the plant to one or more PDMs. The PDMs provide electrical power to various plant loads. In some embodiments, the plant loads may be related to the safety of the operation of the power plant. At least one of the plant loads may be a non-safety related load. In various embodiments, a PDM may be a DC power supply.

In at least one embodiment, the power plant may include one or more power-generating module (PGM) assemblies. At least one of the PGM assemblies may include a nuclear reactor. Accordingly, the power plant may be a modular nuclear power plant.

The operation of a power plant (and the included one or more PGM assemblies) requires powering various loads, such as but not limited to loads that drive motors, valve actuators, sensors, control rooms, control rods, radiation monitors, and other electrical and/or mechanical components. In some embodiments, electrical power is required to startup and/or operate a PGM assembly, but is not required to safely shutdown the operation of the PGM assembly. However, it may still be critical to provide DC power to the plant when the one or more PGM assemblies are not generating power. For instance, if DC power is momentarily lost to one or more of the plant loads, one or more safety-related system actuations may be triggered.

Because the PDMs are fault-tolerant, a loss of AC power from one or more of the PGM assemblies (or the power-distribution system) will not inadvertently trigger a safety-related system actuation. Furthermore, because the PDMs are fault-tolerant, the power-distribution system and PDMs may be maintained and/or replaced while the power plant is online and generating AC power for remote consumers. Accordingly, the PDMs enable a more flexible power plant maintenance schedule. In some embodiments, a fault tolerant system is a failure tolerant system.

In various embodiments, a PDM may be module-specific PDM. A module specific PDM corresponds to a specific PGM assembly included in the power plant. The module-specific PDM provides power to loads that are specific to the corresponding PGM assembly. In at least one embodiment, at least a portion of the power generated at the power plant and distributed to a particular module-specific PDM is generated by the corresponding PGM assembly, such that the operation of a PGM assembly is self-sustaining. Other PDMs may be common plant PDM. A common plant PDM may provide power to loads that are common to a plurality of PGM assemblies. The power generated at the power plant and distributed to a common plant PDM may be generated by one or more PGM assemblies.

In various embodiments, a module-specific PDM may include two redundant subdivisions: Subdivision I and Subdivision II. Furthermore, a module-specific PDM may include at least four power channels: Channel A, Channel B, Channel C, and Channel D, where Channel A and Channel C are included in Subdivision I and Channel B and Channel D are included in Subdivision II.

To enable fault-tolerance, in some embodiments, each power channel includes two batteries, two battery chargers, and one DC bus. At least one of the batteries may be a valve-regulated lead-acid (VRLA). Each power channel provides power to a corresponding load separation group. Thus, at least four load separation groups may be included: load separation group A, load separation group B, load separation group C, and load separation group D. Load separation group A and load separation group D are redundant, in that the plant loads grouped into each of group A and group D are identical, or at least similar.

In at least one embodiment, when under normal fault-free operating conditions, a portion of the power generated by the power plant is provided to a module-specific PDM as alternating current (AC) at an input voltage. The input voltage may be approximately 480 V AC. The module-specific PDM transforms the AC power into a DC current at an output voltage. In various embodiments, the DC output voltage may be less than the AC input voltage. In at least one embodiment, the output voltage is approximately 125 V DC. While supplying the output voltage to the various load separation groups, the module-specific PDM maintains the float voltage on the included batteries via the corresponding battery chargers.

In the event of loss of the AC input power to a module-specific PDM (a fault event), the batteries continue to provide the DC output power to each of the load separation groups for at least a predetermined amount of time. Each of the redundant batteries may provide the full load to each of the corresponding load separation groups.

In some embodiments, a common plant PDM includes at least two subdivisions: Subdivision I and Subdivision II. Each subdivision includes two redundant batteries, such as but not limited to VRLA batteries, two battery-charging modules, and at least one DC bus. Subdivision I and Subdivision II are redundant, in that the common plant loads corresponding to Subdivision I and Subdivision II are identical, or at least similar.

In at least one embodiment, when under normal fault-free operating conditions, a portion of the power generated by the power plant is provided to a common plant PDM as alternating current (AC) at an input voltage. The input voltage may be approximately 480 V AC. The common plant PDM transforms the AC power into a DC current at an output voltage. In various embodiments, the DC output voltage may be less than the AC input voltage. In at least one embodiment, the output voltage is approximately 125 V DC. While supplying the output voltage, the common plant PDM maintains the float voltage on the included batteries via the corresponding battery chargers.

In the event of loss of the AC input power to a common plant PDM, the batteries continue to provide the DC output power to loads in Subdivision I or Subdivision II for at least a predetermined amount of time. Each of the redundant batteries may provide the full load to each of the corresponding subdivision.

Both the module-specific and the common plant PDMs include sufficient redundancy for each component such that one or more components may be removed from service during normal power plant operation and without a loss of power plant function. Accordingly, maintenance may be performed without taking the plant offline from power generation capacity for remote consumers. PDMs may include switches to transfer loads between the redundant components. For instance, a particular PDM may transfer loads within a single channel within the particular PDM. The switches may be disposed between the batteries, the battery-charging modules, and the various DC buses.

Illustrated Operating Environment

FIG. 1A provides a schematic view of a power-generating module (PGM) assembly 100 that is consistent with the various embodiments disclosed herein. In some embodiments, PGM assembly 100 is a modular nuclear reactor assembly, although other embodiments are not so constrained and PGM assembly 100 may be any modular assembly that generates flowing energy (heat). In some embodiments, PGM assembly 100 is a modular fission reactor assembly. In at least one embodiment, PGM assembly 100 is a modular fusion reactor assembly.

PGM assembly 100 may be housed in a PGM bay 144. The PGM bay 144 may include a cooling pool 146 of water or some other material that includes thermal properties enabling the cooling of PGM assembly 100. At least a portion of the PGM assembly 100 may be submerged in the cooling pool 146. Accordingly, at least a portion of the PGM assembly 100 may be below the top of a water line 147 of the cooling pool.

PGM assembly 100 includes PGM core 102. PGM core 102 may be any device, assembly, apparatus, or configuration that is employed to controllably generate heat. Thus, PGM assembly 100 may be an embodiment of a heat generating assembly. In some embodiments, PGM core 102 may be a nuclear reactor core, such as but not limited to a fission reactor core. PGM core 102 may be immersed in PGM coolant 148. In at least one embodiment, PGM coolant 148 includes water or any other material that enables the flow of heat (generated by the PGM core 102) away from the PGM core 102.

In some embodiments, PGM assembly 100 includes a core shroud 134 that at least partially constrains, channels, or otherwise guides a flow of PGM coolant 148. As shown in FIG. 1A, PGM core 102 may be at least partially surrounded by the core shroud 134. The PGM core 102, the core shroud 134, and the PGM coolant 148 are housed within a pressure vessel 104.

In various embodiments, PGM core 102 generates heat that is transferred to the PGM coolant 148. As shown by the flow arrows in FIG. 1A, heating the PGM coolant 148 in the pressure vessel 104 generates a generally vertical circular convection current of the PGM coolant 148. The core shroud 148 at least partially constrains, channels, or otherwise guides the generally vertical circular convection current of the PGM coolant 148. A pressurizer 108 may regulate the internal pressure within pressure vessel 104 that is due to at least the heating and/or the convection current of the PGM coolant 148.

The PGM core 102 heats the portion of the PGM coolant 148 that is in the lower plenum 136 of the core shroud 134. The heated PGM coolant 148 flows upward and out of the shroud riser 138. As the PGM coolant 148 flows upward, the heated PGM coolant 148 provides heat to a plurality of steam generators 122. Due to at least this heat exchange, as the heated PGM coolant 148 flows out of the shroud riser 138, the PGM coolant 148 is cooled. As shown by the flow arrows in FIG. 1A, once outside of the shroud riser 138, the PGM coolant 148 flows generally downward between the core shroud 134 and the pressure vessel 104. The convection current pulls the cooled PGM coolant 148 near the lower plenum 136 back into the core shroud 134. The PGM core 102 reheats the PGM coolant 148 such that the convection current continues to circulate and cool the PGM core 102.

The pressure vessel 104 may be housed within a containment vessel 106. The containment vessel 106 may insure the containment of material within the pressure vessel 104, including any material included in the PGM core 102, as well as the PGM coolant 148. In some embodiments, the PGM assembly 100 includes a plurality of PGM vent valves 110 and/or a plurality of PGM recirculation valves 118 to vent pressure within and/or dissipate excess heat away from the pressure vessel 104.

Feedwater may flow in a circuit that includes the steam generators 122 and electrical generators (not shown in FIG. 1A). Within the steam generators 122, the feedwater is heated to generate stream. The generated steam flows out of the steam headers 126 and carries the transferred heat away from PGM assembly 100. A plurality of steam isolation valves 114 regulate the flow of the steam away from the PGM assembly 100. The steam may be routed via a steam bus, such as but not limited to steam bus 160 of FIG. 1B, to electrical generators, such as but not limited to turbine generator 176 of FIG. 1B, to generate electrical power or some other form of usable power.

After the energy within the steam generates the electrical power, the return of the cooled feedwater to the PGM assembly 100 may be regulated via a plurality of feedwater isolation valves 112. The cooled feedwater is returned to the steam generators 122 via the feedwater headers 124, to complete the circuit.

In at least some embodiments, even after a shutdown of the PGM assembly 100, the PGM core 102 may continue to generate heat. For instance, in embodiments where the PGM core 102 includes a nuclear reactor core, the nuclear reactor core may continue to generate heat during a decay period associated with the spent fuel within the nuclear reactor core. The heat that is generated after a shutdown of the PGM assembly 100 may be decay heat. Accordingly, to ensure that the PGM core 102 and other components of the PGM assembly 100 do not overheat, at least due to decay heat, the power generated by the PGM core 102 may be dissipated.

To dissipate decay heat in some embodiments, the PGM assembly 100 includes a decay hear removal system (DHRS). The DHRS may include a plurality of DHRS heat exchangers 120 submerged in the cooling pool 146 of the PGM bay 144, as well as a plurality of a plurality of DHRS valves 116 to divert the flow of the feedwater/steam away from the steam bus.

During a shutdown of the PGM assembly 100, or during another event where it is desired to not provide the steam and/or heated feedwater to the electrical generators, the plurality of steam isolation valves 114 may be closed such that the steam and/or heated feedwater does not flow to the electrical generators. Rather, the steam and/or heated feedwater flows through the plurality of DHRS heat exchangers 120 and is cooled. The DHRS heat exchangers 120 dump the excess heat into cooling pool 146. The circular flow of feedwater through the decay heat exchangers 120 may be regulated by the plurality of DHRS valves 116.

The rate of power generation of the of the PGM core 102 may be regulated by the positioning of one or more control rods 130. The positioning of the one or more control rods 130 may be driven by control rod drives 132.

PGM assembly 100 includes a plurality of diagnostic sensors 140 schematically shown in FIG. 1A. Diagnostic sensors 140 may sense and/or generate sensor data to monitor various components of PGM module 100. Diagnostic sensors 140 may include various types of sensors, such as but not limited to temperature sensors, pressure sensors, valve configuration sensors control rod positioning sensors, radioactivity sensors, fluid and gas flow sensors, or any other sensor that monitors parameters of the PGM assembly 100. Diagnostic sensors 140 provide sensor output signals on a sensor data bus 142. Sensor output data may be diagnostic sensor data, or simply sensor data. Diagnostic sensors 140 may include safety sensors or safety-related sensors, as well as asset protection-related sensors.

Figure 1B:
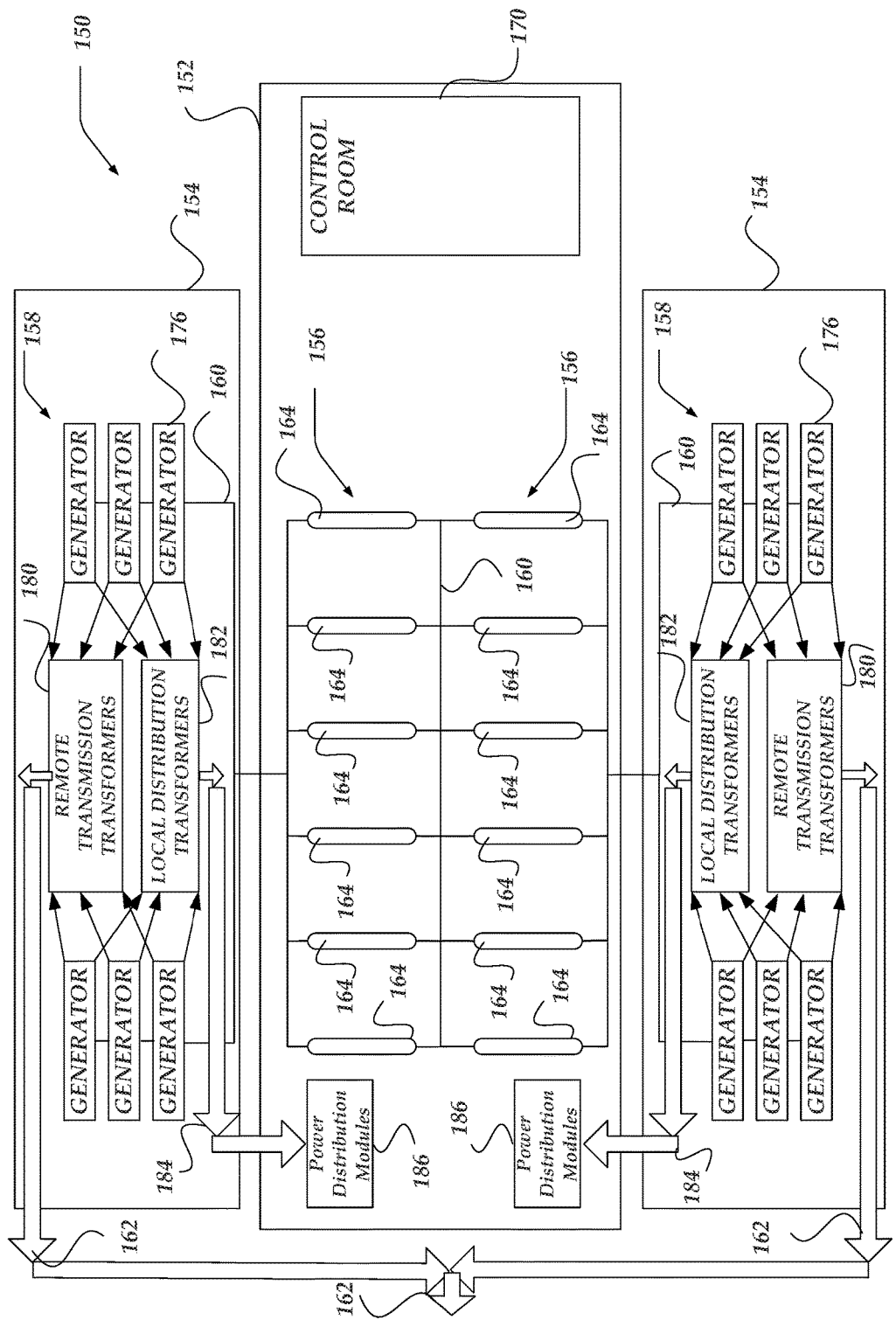
FIG. 1B provides a schematic view of a modular power plant that is consistent with the various embodiments disclosed herein.

FIG. 1B provides a schematic view of a modular power plant 150 that is consistent with the various embodiments disclosed herein. Modular power plant 150 includes power-generating module (PGM) assembly array 156. PGM assembly array 156 includes one or more PGM assemblies, such as but not limited to PGM assemblies 164. In some embodiments, at least one of the PGM assemblies 164 included in PGM assembly array 156 may include similar features to PGM assembly 100 of FIG. 1A. As shown in FIG. 1B, in at least one embodiment, PGM assembly array 156 includes twelve PGM assemblies. However, in other embodiments, the number of PGM assemblies included in PGM assembly array 156 includes more or less than twelve PGM assemblies. A PGM housing 152 may house at least a portion of the PGM assembly array 156.

In some embodiments, one or more generator housings 154 house a generator array 158. Generator array 158 includes one or more devices that generate electrical power or some other form of usable power from steam generated by the PGM assembly array 156. Accordingly, generator array 158 may include one or more electrical generators, such as but not limited to turbine generators 176. As shown in FIG. 1B, in at least one embodiment, generator array 158 includes twelve electrical generators. However, in other embodiments, the number of electrical generators included in generator array 158 includes more or less than twelve electrical generators. In at least one embodiment, there is a one to one correspondence between each PGM assembly included in PGM assembly array 156 and each electrical generator included in generator array 158.

A steam bus 160 may route the steam generated by PGM assembly array 156 to the generator array 158. The steam bus 160 may provide the one to one correspondence between the PGM assemblies included in the PGM assembly array 156 and the electrical generators included in the generator array 158. For instance, the steam bus 160 may insure that the steam generated by a particular PGM assembly is provided only to a particular electrical generator. The steam bus 160 may additionally insure that the steam provided to the particular electrical generator is generated only by the particular PGM assembly.

A portion of the power generated by each of the generators in each of the generator arrays 158 may be transmitted to remote consumers. For instance, a portion of the generated power may be provided to a switchyard and fed into a power grid to be transmitted to remote consumers. This remotely transmitted power may provide electrical power to homes, businesses, and the like.

However, at least another portion of the generated power may be used locally within power plant 150 to at least partially operate power plant 150. For instance, a portion of the generated electrical power may be distributed to various electrical loads within power plant 150. The locally distributed power may be utilized for the operation of power plant 150, such as, but not limited to, providing power to the control room 170 of power plant 150.

In order to match the transmission voltages of the switchyard and a power grid, the portion of the power generated by each generator to be remotely transmitted is routed, via a power signal, to one or more remote voltage transmission transformers 180. Because the transmission of electrical power may be more efficient at higher voltages, in some embodiments, the one or more remote transmission transformers 180 may be step-up transformers.

FIG. 1B shows the remotely transmitted power portion from each of the generators routed to remote transmission transformers 180. After the voltage is transformed to a transmission voltage, the power to be remotely transmitted is routed, via a remote transmission bus 162 to a switchyard (not shown). Because remote transmission transformers 180 provide power for the end users of power plant 150, transformers included in the remote transmission transformers 180 may be main power transformers (MPTs).

In order to provide local power at appropriate voltages within power plant 150, the portion of the power generated by each generator to be locally distributed is routed, via a power signal, to one or more local distribution voltage transformers 182. Because the various loads within power plant 150 may require voltages less than the voltage that is output by the generators, the one or more local distribution transformers 182 may be step-down transformers. The transformers included in the local distribution transformers 182 may be unit auxiliary transformers (UATs).

FIG. 1B shows the locally distributed portion of the power signal from each of the generators routed from the generators to local distribution transformers 182. After the voltage of the power signal is transformed to one or more local distribution voltages, the power signal to be locally distributed is routed, via a local distribution bus 184, to one or more power-distribution modules (PDM) 186. The PDMs 186 provide power to the various loads within power plant 150. The PDMs 186 may be fault-tolerant PDMs.

Figure 1C:
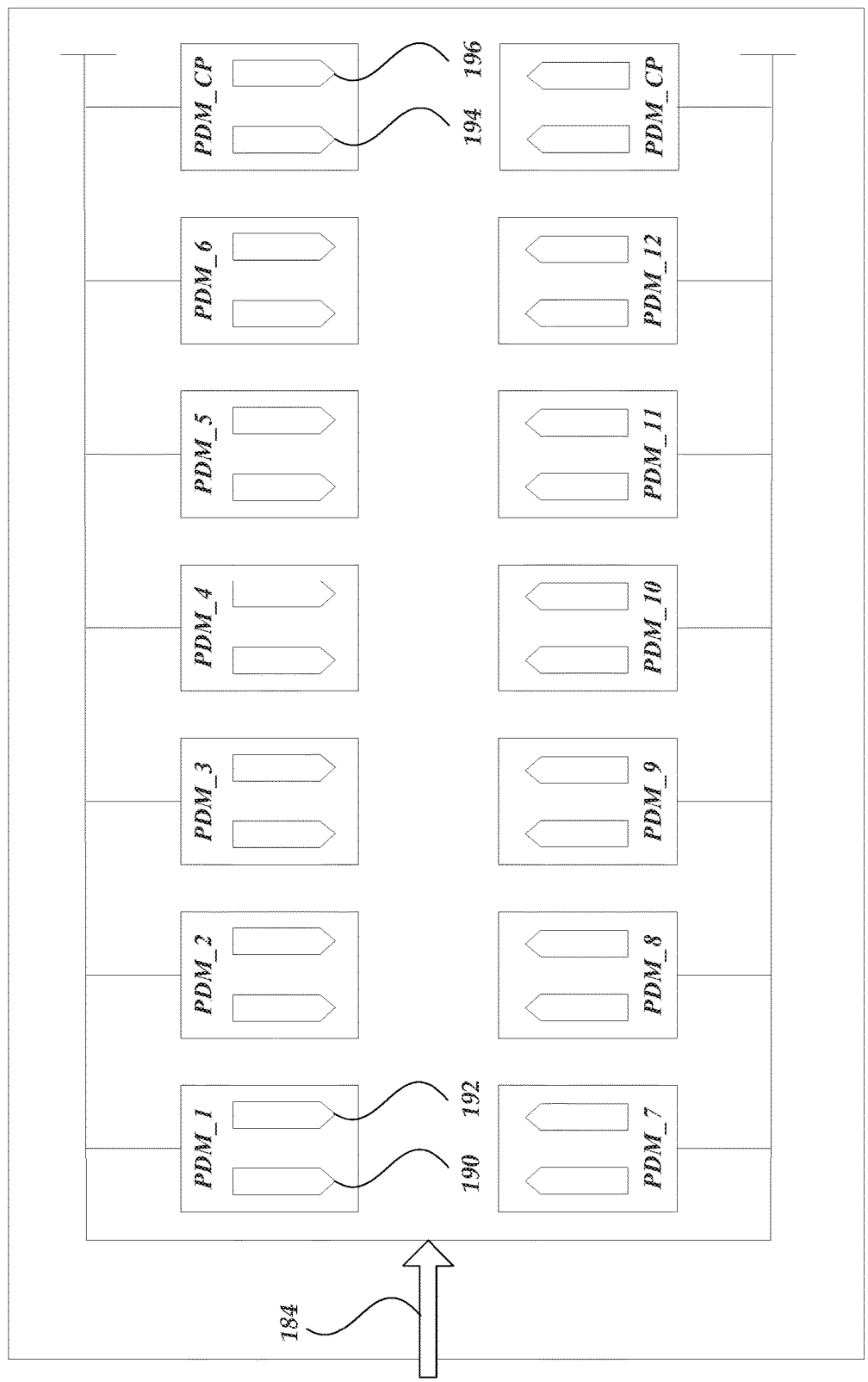
FIG. 1C provides a schematic view of a plurality of fault-tolerant PDM feeds for the PDMs of FIG. 1B that are consistent with the various embodiments disclosed herein.

FIG. 1C provides a schematic view of a plurality of fault-tolerant PDM feeds for the PDMs 186 of FIG. 1B that are consistent with the various embodiments disclosed herein. A PDM feed (or simply a feed) may be an electrical coupling or connection that provides AC electrical power from the local distribution bus 184 to one or more corresponding PDMs. As such, although the PDMS are not shown in FIG. 1C, each of feeds shown in FIG. 1C provide power to a corresponding PDM that distributes the power to the power plant. At least a portion of the PDMs may be specific to or correspond to a generator included in the generator array 158 of power plant 150. Various embodiments of PDMs are discussed throughout, including at least with respect to FIGS. 3A-4B.

As shown in FIG. 1C, there are twelve PDM feeds where each PDM feed provides power to a PDM that corresponds to one of the twelve generators included in generator arrays 158. These twelve module-specific PDM feeds are labeled PDM_1-PDM_12. Furthermore, the plurality of PDMs feeds may include one or more common plant PDM feeds, such as the two common-plant PDMs (PDM_CP) shown in FIG. 1C.

An alternating current (AC) power signal is provided to each of the plurality of PDM feeds via local distribution bus 184. In at least one embodiment, the AC power signal provided to each of the PDM feeds is generated by the corresponding PGM assembly/generator pair of power plant 150 of FIG. 1B. Each of the PDM feeds is enabled to receive power from the local distribution bus and provide the power to one or more corresponding PDMS. As discussed below, a PDM is enabled to employ the received AC power signal to provide a direct current (DC) power signal to supply electrical power to various plant loads.

In some embodiments, a module-specific PDM (such as those that are provided power via PDM feeds PDM_1-PDM_12) provides DC power to loads that are specific to the corresponding PGM assembly and generator pair that generated the power provided to the module-specific PDM. A common-plant PDM (such as those that are provided power via one of PDM feeds PDM_CP) may provide DC power to loads that are common to a plurality of PGM assemblies and to the power plant.

As discussed further below, each of the PDMs include batteries and corresponding battery chargers. The PDMs are enabled to store energy provided by the AC power signal such that in the event that a particular PGM, generator, or the power distribution system faults and/or shutdowns, each of the PDMs may continue to provide DC power, via the included batteries, to fully supply the required loads. For instance, each of the PDM feeds may include a plurality of redundant feeds, shown schematically as redundant feeds 190 and 192 for module-specific feed PDM_1 and redundant feeds 194 and 196 for common-plant feed PDM_CP.

Furthermore, each PDM is fault-tolerant in that faults within a specific PDM will not inhibit the PDM from providing the DC power signals at full capacity. As such, each PDM includes redundant channels, batteries, battery chargers, and the like. As discussed further below, a module-specific PDM, such as provided by feed PDM_1 includes two redundant subdivisions: Subdivision I and Subdivision II. As discussed below, each subdivision in module-specific may enabled to provide the DC power signals required to operate, shutdown, and monitor the corresponding PGM, for at least a predetermined amount of time. In some embodiments, electrical power is not required to safely shutdown a PGM. Each subdivision may provide the required DC power when AC power signal is delivered via local distribution bus 184. Furthermore, each subdivision may provide the required DC power when the AC power signal is not delivered via local distribution bus 184.

The module-specific PDM provided power by PDM_1 may tolerate a fault in one of Subdivision I or Subdivision II because the subdivisions are independent and/or redundant. As further discussed below, subdivisions within module-specific PDMs include multiple channels that further increase redundancy. Likewise, a common-plant PDM, such as the PDM provided power by one of PDM_CS includes two redundant subdivision: Subdivision I and Subdivision II.

Fault-Tolerant Power Distribution Systems

FIGS. 2A-4B include one-line diagrams of power-distribution systems and modules. As such, structures, features, and components are shown in somewhat schematic representations. The various embodiments may include more (or less) components and features as shown in FIGS. 2A-4B. Accordingly, each switchgear module, cable bus module, and other structures shown in the various figures may include more or less components, such as switches, breakers, busses, connections, fuses, and input/output terminals. Only single conducting (or power transmission) paths are represented. However, several conducting paths, input/output terminals, and the like may be present in the various embodiments. An input terminal, output terminal, or other sort of connection may be shown to schematically represent multiple inputs, outputs, or other connections. Busses or transmission paths may be shown as a single line but include several separate and distinct transmission paths to transmit separate power signals from separate sources to separate destinations. The various power signals may be multi-phase signals, such as three-phase signals. One-line diagrams are used throughout for simplicity and clarity in presentation.

Figure 2A:
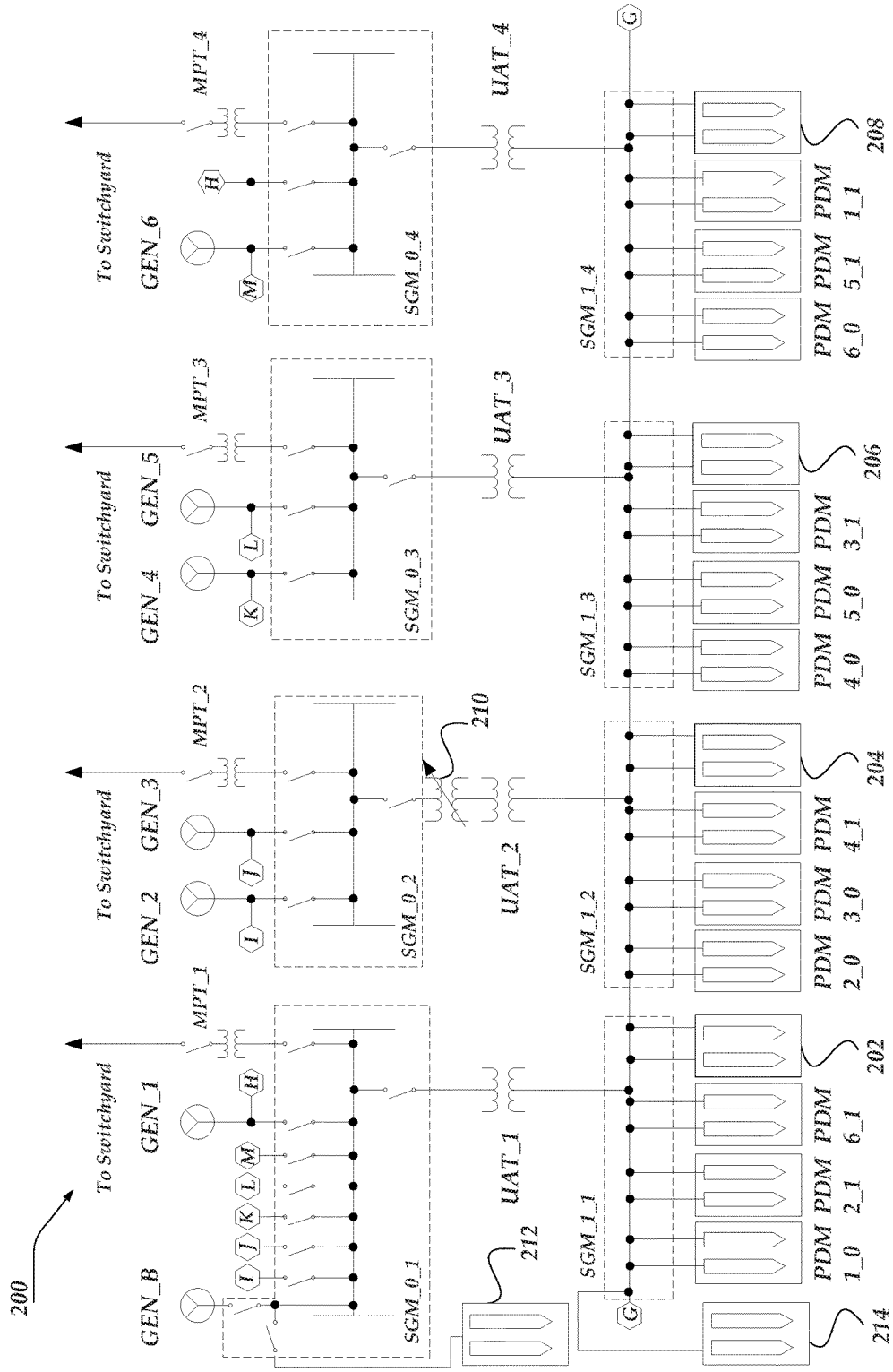
FIG. 2A shows a one-line schematic diagram for a first portion of a fault-tolerant power distribution system that distributes locally generated power for the operation of a power plant that includes twelve modular generators.
Figure 2B:
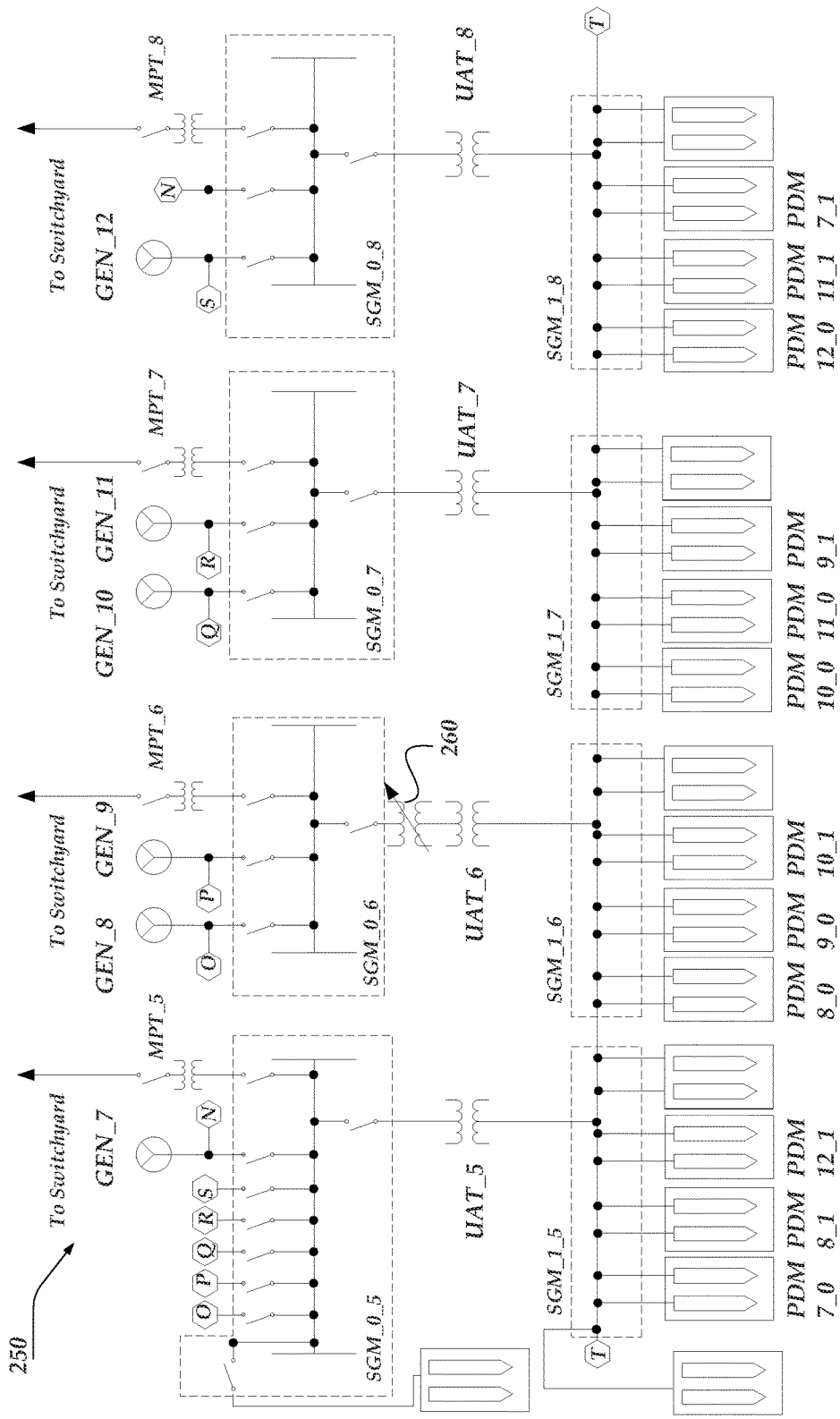
FIG. 2B shows a one-line schematic diagram for a second portion of a fault-tolerant power distribution system that distributes locally generated power for the operation of a power plant that includes twelve modular generators.

FIG. 2A shows a one-line schematic diagram for a first portion 200 of a fault-tolerant power distribution system that distributes locally generated power for the operation of a power plant that includes twelve modular generators. FIG. 2B shows a one-line schematic diagram for a second portion 250 of a fault-tolerant power distribution system that distributes locally generated power for the operation of a power plant that includes twelve modular generators.

In FIGS. 2A and 2B, some of the details regarding switchgear are shown only schematically. Accordingly, more or less switches, breakers, and other components may be included. Portion 200 of the system (FIG. 2A) may be directed towards the upper six PM assemblies and upper six generators of power plant 150 of FIG. 1B. Portion 250 of the system (FIG. 2B) may be directed towards the lower six PM assemblies and lower six generators of power plant 150. The system is a fault tolerant system with redundant power transmission paths, PDMs main power transformers (MPTs), and unit auxiliary transformers (UATs).

Portion 200 includes six generators: GEN_1, GEN_2, GEN_3, GEN_4, GEN_5, and GEN_6. Each of the six generators is selectively coupled to at least two of four front-end switchgear modules (SGM): SGM_0_1, SGM_0_2, SGM_0_3, and SGM_4. A separate main power transformer (MPT) is selectively coupled to one of the four front-end switchgear modules to redundantly provide power to the switchyard. Portion 200 also includes a corresponding backend switchgear module for each of the four front-end modules: SGM_1_1, SGM_1_2, SGM_1_3, and SGM_1_4. Each front-end switchgear module is coupled to the corresponding backend switchgear module via cable bus modules and a corresponding unit auxiliary transformer: UAT_1, UAT_2, UAT_3, and UAT_4. As shown in FIG. 2A, a voltage regulating transformer 210 may be used in combination with one or more of the UATs.

Portion 200 also includes a power-distribution module for each of the six generators. The power-distribution modules are not shown in FIG. 2A. Each of the six power-distribution modules includes at least two redundant power-distribution modules feeds. Each of power-distribution module feeds PDM_1_0 and PDM_1_1 provides power to the power-distribution module that corresponds to GEN_1. Each of power-distribution module feeds PDM_2_0 and PDM_2_1 provides power to the power-distribution module that corresponds to GEN_2. Each of power-distribution module feeds PDM_3_0 and PDM_3_1 provides power to the power-distribution module that corresponds to GEN_3. Each of power-distribution module feeds PDM_4_0 and PDM_4_1 provides power to the power-distribution module that corresponds to GEN_4. Each of power-distribution module feeds PDM_5_0 and PDM_5_1 provides power to the power-distribution module that corresponds to GEN_5.

Each of power-distribution module feeds PDM_6_0 and PDM_6_1 provides power to the power-distribution module that corresponds to GEN_6.

Various embodiments of a power-distribution module feed (for instance PDM_1_0) includes four sub-feeds. As described below, various embodiments of power-distribution modules include four separate channels (Channel A, Channel B, Channel C, and Channel D). Such embodiments include power-distribution module 300 of FIG. 3A. PDM_1_0 feeds into two of the four channels (for instance Channel A and Channel C) of the corresponding power-distribution module. Two of the sub-feeds of PDM_1_0 feed into one of the two channels (for instance Channel A) and the other two sub-feeds of PDM_1_0 feed into the other channel of the two channels (for instance Channel C). Similarly, PDM_1_1 feeds into the other two of the four channels (for instance Channel B and Channel D) of the corresponding power-distribution module. Two of the sub-feeds of PDM_1_1 feed into one of the two channels (for instance Channel B) and the other two sub-feeds of PDM_1_1 feed into the other channel of the two channels (for instance Channel D). Accordingly, various embodiments of power-distribution module, such as but not limited to PDM 300 of FIG. 3A, receive power from up to 8 separate sub-feeds (four separate sub-feeds in each of two power-distribution feeds). As shown in at least FIG. 3A, each of the four sub-feeds within a power-distribution module feed feeds into a separate charging module included in the corresponding power-distribution module.

Each of these redundant power-distribution module feeds is coupled to the outputs of one of four backend switchgear modules: SGM_1_1, SGM_1_2, SGM_1_3, and SGM_1_4. The system shown in FIGS. 2A-2B is a fault tolerant system with redundant power transmission paths, power-distribution module feeds, main power transformers (MPTs), and unit auxiliary transformers (UATs) for each of the generators.

In various embodiments, the system may include one or more backup generators (GEN_B). In at least one embodiment, the voltage output of GEN_B is approximately 13.8 kVAC. GEN_B may be coupled to feed 212 through one or more switches. GEN_B may also be coupled to one or more of the front-end switchgear modules: SGM_0_1, SGM_0_2, SGM_0_3, SGM_0_4, SGM_0_5, and SGM_0_6 through one or more switches. GEN_B may be employed to provide power to the power plant in the event that one or more of the PGM assemblies and/or corresponding generators is unavailable for power generation. A first feed 212 corresponding to GEN_B may be selectively coupled to at least one of the front-end modules, such as but not limited to SGM_0_1. A second feed 212 corresponding to GEN_B may be selectively coupled to one of the backend modules, such as but not limited to SGM_1_1. In some embodiments, one or more other backup generators (not shown in FIG. 2A) may be configured provide an AC signal to the one or more of the PDMS at a lower voltage than the AC signals generated by GEN_B. For instance, GEN_B may generate a 13.8 kV AC signal, while the one or more generators that provide power to the PDMs may generate a 480 V AC signal.

The system may include additional power-distribution module feeds coupled to one or more of the backend switchgear modules. For instance, power-distribution module feeds 202, 204, 206, and 208 may provide power to other power-distribution modules that distribute power to loads that are common to each of the six generators included in system portion 200. The power-distribution modules that are provided power by power-distribution module feeds 202, 204, 206, and 208 may be common-plant PDMs. Accordingly, feeds 202, 204, 206, and 208 may be common-plant feeds. Power-distribution module feeds 202, 204, 206, and 208 may provide power to power-distribution modules for various common pumps and motors included in the power plant.

As described below, various embodiments of power-distribution modules include two separate subdivisions (Subdivision I and Subdivision II). Such embodiments include power-distribution module 400 of FIG. 4A. A common-plant feed, such as but not limited to feeds 202, 204, 206, and 208 feeds into each of the subdivisions of the corresponding common plant power-distribution modules. Two of the sub-feeds of common-plant feed 202 feed into one of the two subdivisions (for instance Subdivision I) and the other two sub-feeds of common-plant feed 202 feed into the other subdivision (for instance Subdivision II). Accordingly, various embodiments of power-distribution modules, such as but not limited to PDM 400 of FIG. 4A, receive power from up to four separate sub-feeds included in a common-plant power distribution feed. As shown in at least FIG. 4A, each of the four sub-feeds within a common-plant power-distribution module feed feeds into a separate charging module included in the corresponding common-plant power-distribution module Each of the various power-distribution modules may distribute power in real time. Furthermore, as discussed in the context of FIGS. 3A-4B, one or more of the power-distribution modules may include one or more charging modules to charge one or more batteries that store power for later use. Feed 212 corresponds to GEN_B may be coupled to one or more of the front-end switchgear modules. Feed 214 may be coupled to one or more of the backend switchgear module.

System portion 250 of FIG. 2B includes similar features to system portion 200 of FIG. 2A. For instance, system portion 250 includes six generators: GEN_7, GEN_8, GEN_8, GEN_10, GEN_11, and GEN_12. Each of the six generators is selectively coupled to at least two of four front-end switchgear modules: SGM_0_5, SGM_0_6, SGM_0_7, and SGM_8. A separate main power transformer (MPT) is selectively coupled to one of the four front-end switchgear modules to redundantly provide power to the switchyard. Portion 250 also includes a corresponding backend switchgear module for each of the four front-end modules: SGM_1_5, SGM_1_6, SGM_1_7, and SGM_1_8. Each front-end switchgear module is coupled to the corresponding backend switchgear module via a corresponding unit auxiliary transformer: UAT_5, UAT_6, UAT_7, and UAT_8. As shown in FIG. 2B, a voltage regulating transformer 260 may be used in combination with one or more of the UATs.

Portion 250 also includes a power-distribution module (not shown) for each of the six generators. Each of the six power-distribution modules includes at least two redundant power-distribution modules feeds. Each of power-distribution module feeds PDM_7_0 and PDM_7_1 provides power to the power-distribution module that corresponds to GEN_7. Each of power-distribution module feeds PDM_8_0 and PDM_8_1 provides power to the power-distribution module that corresponds to GEN_8. Each of power-distribution module feeds PDM_9_0 and PDM_9_1 provides power to the power-distribution module that corresponds to GEN_9. Each of power-distribution module feeds PDM_10_0 and PDM_10_1 provides power to the power-distribution module that corresponds to GEN_10.

Each of PDM_11_0 and PDM_11_1 correspond to GEN_11. Each of power-distribution module feeds PDM_12_0 and PDM_12_1 provides power to the power-distribution module that corresponds to GEN_12. Each of these redundant power-distribution module feeds is coupled to the outputs of one of four backend switchgear modules. As discussed above in the context of FIG. 2A, various embodiments of power-distribution module feeds include four sub-feeds. Common-plant power-distribution module feeds are also shown in portion 250.

Module-Specific Power-Distribution Modules

Figure 3A:
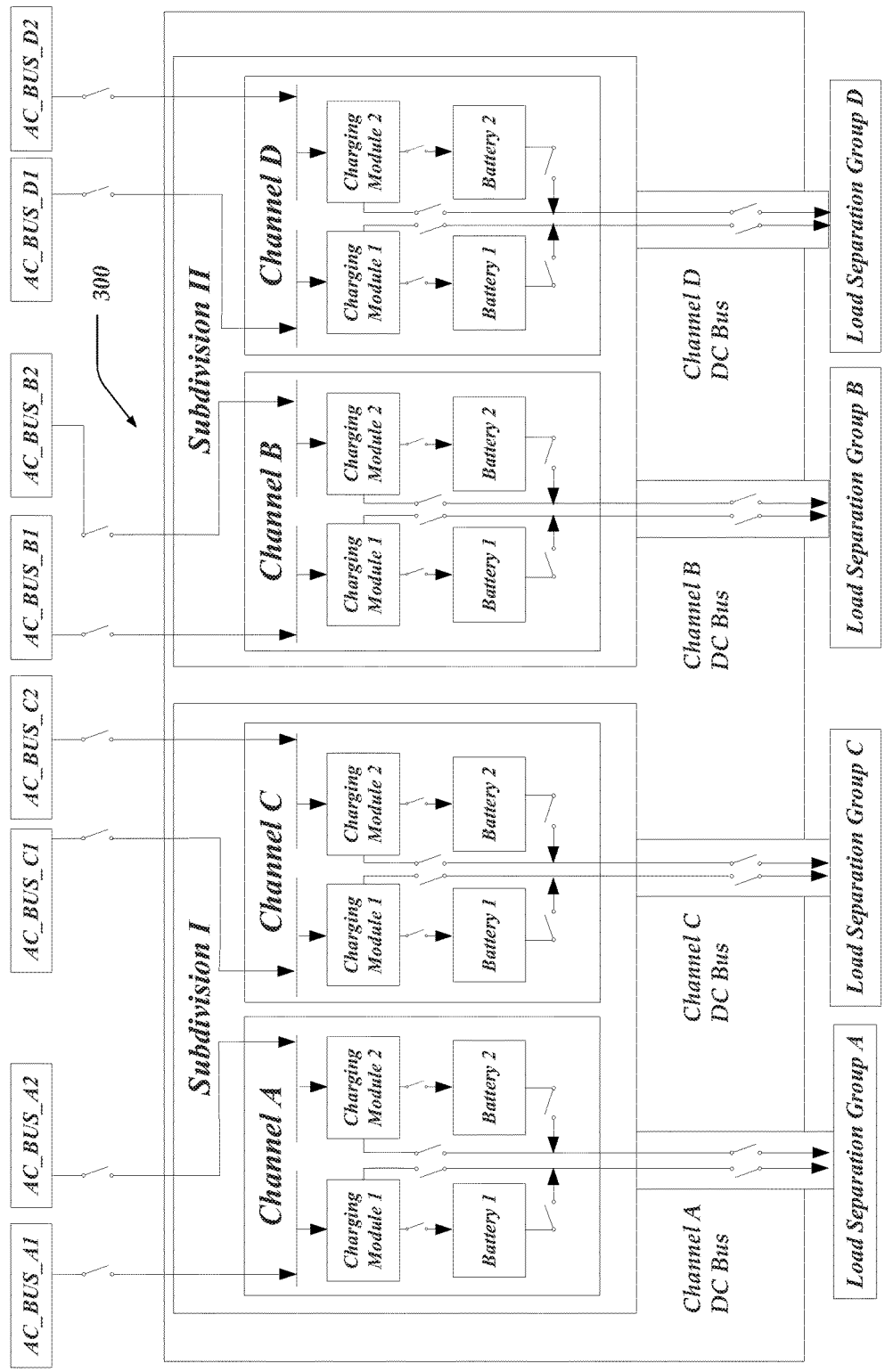
FIG. 3A shows a schematic view of an embodiment of a fault-tolerant module-specific power-distribution module.

FIG. 3A shows a schematic view of an embodiment of a fault-tolerant module-specific PDM 300. Module-specific PDM 300 provides a DC power signal to a plurality of module-specific plant loads associated with and/or assigned to module-specific PDM 300. Module-specific PDM 300 includes two subdivisions: Subdivision I and Subdivision II. Subdivision I includes two power channels: Channel A and Channel C. Subdivision II also includes two channels: Channel B and Channel D.

As discussed further below, each of the power channels may include at least two redundant batteries, at least two redundant battery charging modules, and a DC bus. Each of the four channels provides power to a corresponding load separation group (LSG). For example, Channel A serves the corresponding LSG A. Module-specific loads associated with and/or assigned to Channels A and D are equivalent. Likewise, module-specific loads associated with and/or assigned to Channels B and C are equivalent.

Under normal power plant operations, such as when the corresponding PGM is generating power, the module-specific PDM 300 receives an AC power signal that is generated from within the power plant. Module-specific PDM 300 outputs a DC power signal that includes energy from the received AC power signal. The voltage of the AC power signal may be greater than the voltage of the outputted DC power signal. For instance, the voltage of the inputted AC power signal may be approximately 480 V AC. The voltage of the outputted DC signal may be approximately 125 V DC. Module-specific PDM 300 provides the outputted DC power signal to the associated and/or assigned plant loads, while charging and/or maintaining the float voltage on the redundant batteries.

In the event that the AC power signal is not being received (such as when the operation of the PGM that generated the AC signal is shutdown), at least one of the batteries included in the module-specific PDM 300 outputs that DC power signal. The batteries may be enabled with sufficient capacity to supply the assigned plant loads for a predefined duty cycles, such as 24 or 72 hours. Each of the two redundant batteries included in a power channel may be enabled to carry the full load assigned to the power channel. In some embodiments, both batteries included in a channel may be enabled to fully supply the load for at least 24 hours. In other channels, both batteries may be enabled to fully supply the load for at least 72 hours. For instance, both batteries in each of Channel A and Channel D may be enabled to fully supply the load for at least 24 hours. Similarly, both batteries in each of Channel B and Channel C may be enabled to fully supply the load for at least 72 hours.

As described below, module-specific PDM 300 includes such redundancy that any component included in module-specific PDM 300 may be removed from service (such as for maintenance operations), or experience a fault-condition without loss of functionality of module-specific PDM 300.

More specifically, each channel provides power to a load separation group: Load Separation Group A, Load Separation Group B, Load Separation Group C, and Load Separation Group D for the respective channels. As discussed further below, the loads assigned to Load Separation Group A and D are identical. Additionally, each load separation group includes a complete, independent set of equipment that requires power. Accordingly, Channels A and D are redundant channels. Similarly, Channels B and C are redundant channels because the loads assigned to Load Separation Group B and D are identical.

For instance, Channel A may provide power to a portion of the Instrumentation and Control (I&C) loads associated with the power plant, such as loads associated with I&C separation group A. Channel A may additionally provide power to a portion of the I&C loads associated with Subdivision I (I&C Subdivision I loads). Similarly, Channel C may provide power to loads associated with I&C separation group C. Furthermore, because Subdivision I is a redundant subdivision, Channel C may also provide power to at least a portion of the I&C Subdivision I loads.

One or more AC power signals are provided to module-specific PDM 300 via one or more AC busses, which may include one or more AC power busses. For instance, as shown in FIG. 3A, each of AC_BUS_A1 and AC_BUS_A2 provides power to Channel A. Each of AC_BUS_C1 and AC_BUS_C2 provides power to Channel C. Each of AC_BUS_B1 and AC_BUS_B2 provides power to Channel B. Each of AC_BUS_D1 and AC_BUS_D2 provides power to Channel D. Local distribution bus 184 of FIGS. 1B-1C may include one or more of the AC_BUS_A1, AC_BUS_A2, AC_BUS_C1, AC_BUS_C2, AC_BUS_B1, AC_BUS_B2, AC_BUS_D1, or AC_BUS_D2 as shown in FIG. 3A. The AC power signals may be generated in the power plant, such as by the PGM assembly and generator pair that is specific and/or associated with PDM 300. Thus, PDM 300 includes a plurality of AC inputs from a plurality of AC busses of the power plant that provide an AC signal to the module. The AC inputs are enabled to receive an AC power signal.

Each of the AC busses may be selectively coupled to each of the four corresponding channels. Thus, the AC power signals carried by AC_BUS_A1/AC_BUS_A2 may be selectively provided to Channel A and the AC power signals carried by AC_BUS_B1/AC_BUS_B1 may be provided to Channel B. The AC power signals carried by AC_BUS_C1/AC_BUS_C2 may be provided to Channel C and the AC power signals carried by AC_BUS_D1/AC_BUS_D2 may be provided to Channel D. Switches between a channel AC bus and the corresponding channel may be employed to couple and decouple the channel AC bus to the corresponding channel to selectively provide the AC power signal to the corresponding channel. As shown in FIG. 3A, in some embodiments, these switches are outside of PDM 300. In other embodiments, these switches may be included in PDM 300.

As shown in FIG. 3A, AC_BUS_A1 provides AC power to the charging module 1 of Channel A and AC_BUS_A2 provides AC power to charging module 2 of Channel A. AC_BUS_C1 provides AC power to the charging module 1 of Channel C and AC_BUS_C2 provides AC power to charging module 2 of Channel C. AC_BUS_B1 provides AC power to the charging module 1 of Channel B and AC_BUS_B2 provides AC power to charging module 2 of Channel B. AC_BUS_D1 provides AC power to the charging module 1 of Channel D and AC_BUS_D2 provides AC power to charging module 2 of Channel D. Channels A and C may be included in Subdivision I. Channels B and C may be included in Subdivision II.

Module-specific PDM 300 includes one or more DC busses for each of the channels. As described herein, each of the four channels may selectively provide a DC power signal via the corresponding DC bus. A DC power bus may provide the DC signal to the various plant loads associated with and/or assigned to module-specific PDM 300. A DC bus for a channel may provide the DC signal to a Load Separation Group (LSG) corresponding to the channel. For instance, Channel A DC Bus may provide a DC power signal from Channel A to LSG A, which corresponds to Channel A. Likewise, Channel C DC Bus may provide a DC power signal from Channel C to LSG C. Channel B DC Bus may provide a DC power signal from Channel B to LSG B. Similarly, Channel D DC Bus may provide a DC power signal from Channel D to LSG D.

The first subset of the plurality of module-specific plant loads associated with and/or assigned to Channels A and D may be associated with and/or assigned to LSGs A and D. Similarly, the second subset of the plurality of module-specific plant loads associated with and/or assigned to Channels B and C may be associated with and/or assigned to LSG B and C. As such, LSG A provides the DC power signal to the loads associated with Channel A, LSG B provides the DC power signal to the loads associated with Channel B, LSG C provides the DC power signal to the loads associated with Channel C, and LSG D provides the DC power signal to the loads associated with Channel D.

In various embodiments, each of the four channels includes at least two redundant batteries, which are shown as Battery 1 and Battery 2 in each of Channels A, B, C, and D. In some embodiments, at least one of the batteries may be a valve-regulated lead-acid (VRLA) battery. Furthermore, each channel includes two charging modules: Charging Module 1 and Charging Module 2. Charging Module 1 may charge each of Battery 1 and Battery 2, as well as maintain a battery float voltage on each of Battery 1 and Battery 2. Likewise, Charging Module 2 may charge each of Battery 1 and Battery 2, as well as maintain a battery flow voltage on each of Battery 1 and Battery 2.

As shown in FIG. 3A, switches between a channel AC bus and the corresponding channel selectively couple and decouple the channel AC bus to the corresponding redundant battery/charging module pairs included in the corresponding channel. Accordingly, an AC power signal from a channel AC bus may be selectively provided to either one or both of the battery/charging module pairs included in the corresponding channel. As shown in FIG. 3A, in some embodiments separate and/or independent AC busses (or motor control centers) may be employed to provide AC power to each of the battery/charging module pairs.

Also shown in FIG. 3A, an AC power signal may be selectively provided to at least one of the charging modules included in a channel. Each of the charging modules include one or more rectifiers that rectify the provided AC power signal and output a DC power signal that includes a rectified portion of the AC power signal. In various embodiments, the one or more rectifiers may include one or more rectifier bridges.

The voltage of the inputted AC signal may be different from the voltage of the outputted DC power signal. One or more of the charging modules may include one or more transformers to transform the voltage of at least the inputted AC power signal. In at least one of the embodiments, at least one of the charging modules includes one or more DC-to-DC converters to convert the voltage of the outputted DC power signal. In at least one embodiment, the voltage of the inputted AC power signal is approximately 480 V AC. The voltage of the outputted DC power signal may be approximately 125 V DC.

Each of the charging modules may selectively provide at least a portion of the outputted DC power signal to a DC bus external to PDM 300 via the corresponding LSG. The corresponding LSG provides the DC power signal to the subset of the plurality of loads assigned to the LSG. The switches between a DC bus and each of the corresponding charging modules may be employed to couple and decouple the DC bus to each of the corresponding charging modules to selectively provide the DC power signal to the corresponding LSG.

At least another portion of the outputted DC power signal from a charging module may be selectively provided to the corresponding battery to charge and/or maintain the battery float voltage on the corresponding battery. As shown, switches between the charging module and the corresponding battery may be used to selectively couple and decouple the charging module to the battery. In at least one embodiment, the voltage of the DC power signal provided to the battery may be greater than the voltage of the DC power signal provided to the DC bus to charge and maintain the float voltage on the battery. Thus, separate DC-to-DC converters may be employed in the charging module to generate DC power signals with different voltages.

When the channel AC bus provides the AC power signal to the corresponding channel, such as when the corresponding PGM assembly and generator pair is generating the received AC power signal, at least one of the rectifiers included in the channel provides the DC signal to the LSG that corresponds to the channel. When the AC bus does not provide the AC power signal to the channel, such as when the corresponding PGM assembly and generator pair is shutdown, at least one of the batteries included in the channel provides the DC signal to the LSG that corresponds to the channel. The switches between the batteries and corresponding LSG may be used to selectively couple and decouple the batteries from the corresponding LSG.

Because the first subset of plurality of plant loads are assigned to both Channels A and D, Channels A and D are redundant channels. Likewise, Channels B and C are redundant channels. Because Channels A and C are included in Subdivision I and Channels B and D are included in Subdivision II, Subdivisions I and II are redundant subdivisions. Accordingly, module-specific PDM 300 is a fault-tolerant PDM.

Also, note that each channel includes redundant batteries and redundant charging modules. Accordingly, each channel is a redundant channel. In at least one embodiment, both batteries included in a channel may be enabled to fully supply the load for at least 24 hours. In other channels, both batteries may be enabled to fully supply the load for at least 72 hours. For instance, both batteries in each of Channel A and Channel D may be enabled to fully supply the load for at least 24 hours. Similarly, both batteries in each of Channel B and Channel C may be enabled to fully supply the load for at least 72 hours. The voltage of the DC power signal provided, via a battery, to the DC bus may be equivalent to the voltage of the DC power signal provided, via the charging modules, to the DC bus. Thus, each of the batteries may be approximately 125 V DC batteries.

As discussed throughout, each of the four channels includes two redundant charging battery/charging module pair. A first battery/charging module pair includes Battery 1 and Charging Module 1. A second battery/charging module pair includes Battery 2 and Charging Module 2. For a particular channel to provide the DC power signal to the DC bus, only one of the battery or the charging module of one of the two battery/charging module pairs of the channel is required as operative. Thus components may be removed (for maintenance), while the other string in the channel remain operative. Also, since Channel A and Channel D are redundant channels, only one of the four redundant battery/charging module pairs included in Channels A and D needs operative for module-specific PDM 300 to remain operational. Likewise, since Channel B and Channel C are redundant channels, only one of the four redundant battery/charging module pairs included in Channels B and C needs operative for module-specific PDM 300 to remain operational. Each of the redundant battery/charging pairs may be a separate and/or independent sub-system.

Figure 3B:
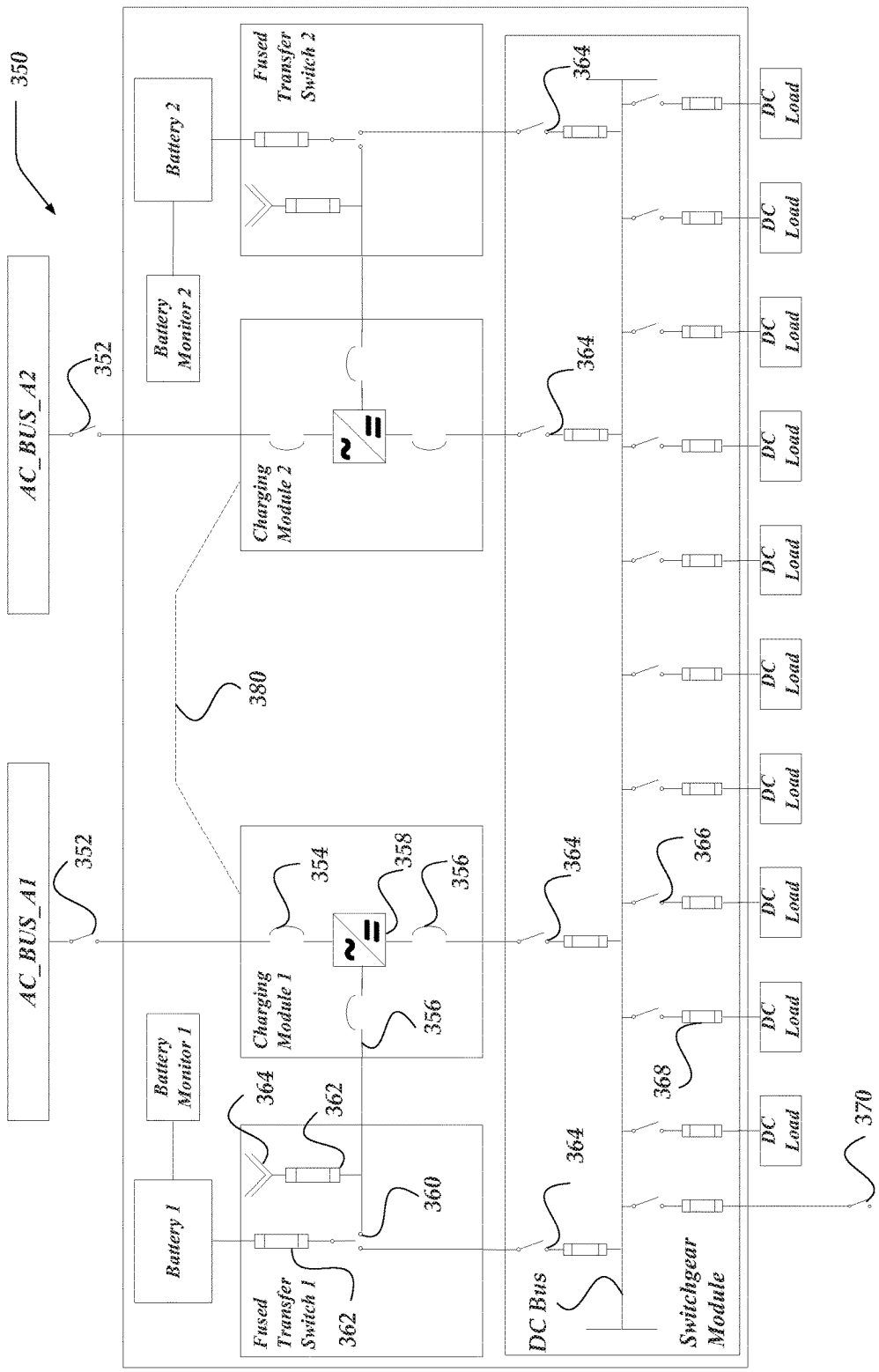
FIG. 3B shows a one-line schematic diagram for Channel A of the module-specific power-distribution module of FIG. 3A.

FIG. 3B shows a one-line schematic diagram for Channel A 350 of the module-specific PDM 300 of FIG. 3A. Channels B, C, and D of PDM 300 may include similar features and/or structures. Channel A 350 includes two redundant battery/charging module pairs. The first pair includes Charging Module 1, Fused Transfer Switch Module 1, Battery 1, and Battery Monitor 1. The second pair includes Charging Module 2, Fused Transfer Switch Module 2, Battery 2, and Battery Monitor 2.

The AC bus selectively provides the AC power signal to each of the charging modules in the first and the second battery/charging module pairs. A power signal is provided by the channel AC bus (AC_BUS_A1 and SC_BUS_A2). The voltage of the provided AC power signal may be approximately 480 V AC. Switches 352 may selectively couple AC_BUS_A1 to the Charging Module 1 and AC_BUS_A2 to Charging Module 2. As shown in FIG. 3B, in some embodiments, switches 352 may be outside of the PDM that includes Channel A 350. In other embodiments, switches 352 may be included in the PDM.

As shown in FIG. 3B, a fused transfer switch module may selectively couple and decouple each of the corresponding batteries to the DC bus included in the switchgear module. A fused transfer switch module may include a changeover switch 360, one or more fuses 362, and a battery test terminal. Changeover switch 360 may be a double pole changeover switch (DPCO).

The charging modules include one or more circuit breakers to provide protection from an over-voltage, under-voltage, or over-current event. For instance, charging modules may include AC supply breaker 354 and DC output breakers 356. The charging modules may also include one or more rectifiers 358 to rectify the provided AC power signal. Rectifier 358 may include one or more transformers or DC-to-DC converters to output a DC power signal at a voltage that is approximately 125 V DC, or at least less than the voltage of the inputted DC signal.

In various embodiments, the charging modules include an indicator that indicates at least one charger output current, voltage, alarms for open DC output circuit breaker, DC output failure, AC supply failure, low and high DC output voltage, charger overload, and ground detection. The charging modules may include relays for high DC voltage shutdown events. Other components included in the charging modules may include transformers, DC-to-DC converters, relays, and other components discussed throughout.

Each redundant battery/charging module pair may also include a separate battery monitor. A battery monitor may include one or more indicators that indicate a battery current and/or voltage. A battery monitor may also include one or more alarms for battery overvoltage, under-voltage, and high or low room temperature. In some embodiments, each of the batteries may include multiple battery cells. For instance, a battery may include at least 60 cells.

In various embodiments, a communication link may be included between the redundant charging modules in each of the channels: A, B, C, and D. A communication link between charging modules may enable the two charging modules to share providing DC power to a single DC bus. Accordingly, in the various embodiments, multiple charging modules are enabled to share in the supplying DC power to the various DC bus loads. For instance, in FIG. 3B, communication link 380 is included between Charging Module 1 and Charging Module 2 for Channel A. Communication link 380 may include load-sharing circuity to enable Charging Module 1 and Charging Module 2 to share providing DC power to the DC bus for Channel A. It should also be noted that Charging Module 1 of Channel A is enabled to charge Battery 1 while simultaneously providing DC power to the DC bus for Channel A. Furthermore, Charging Module 2 of Channel A is enabled to charge Battery 2 while simultaneously providing DC power to the DC bus for Channel A.

At least a portion of the DC bus for Channel A 350 may be included in a switchgear module. The switchgear module may provide the DC signal to a LSG, such as LSG A in FIG. 3A. As shown, a plurality of switches 364 may selectively couple the charging modules and the batteries (via fused transfer switch modules) to the DC bus.

The switchgear module may include another plurality of switches, such as switch 366 that selectively couples the DC bus to each of the DC loads associated with and/or assigned to LSG A. Switchgear module may include a plurality of fuses, such as fuse 368, to protect the various DC loads from an over current event. In various embodiments, at least one of the plurality of switches included in the switchgear module may be a double-pole single-throw (DPST) switch. The switchgear module may also include one or more alarms to indicate a change of a switch or breaker status.

The plurality of DC loads may include, but are not otherwise limited to radiation monitors, sensors, motors, actuators, valves, loads associated with the control room, or any loads required to start, operate, and shutdown a PGM assembly, such PGM assembly 100 of FIG. 1A.

Common Plant Power-Distribution Modules

Figure 4A:
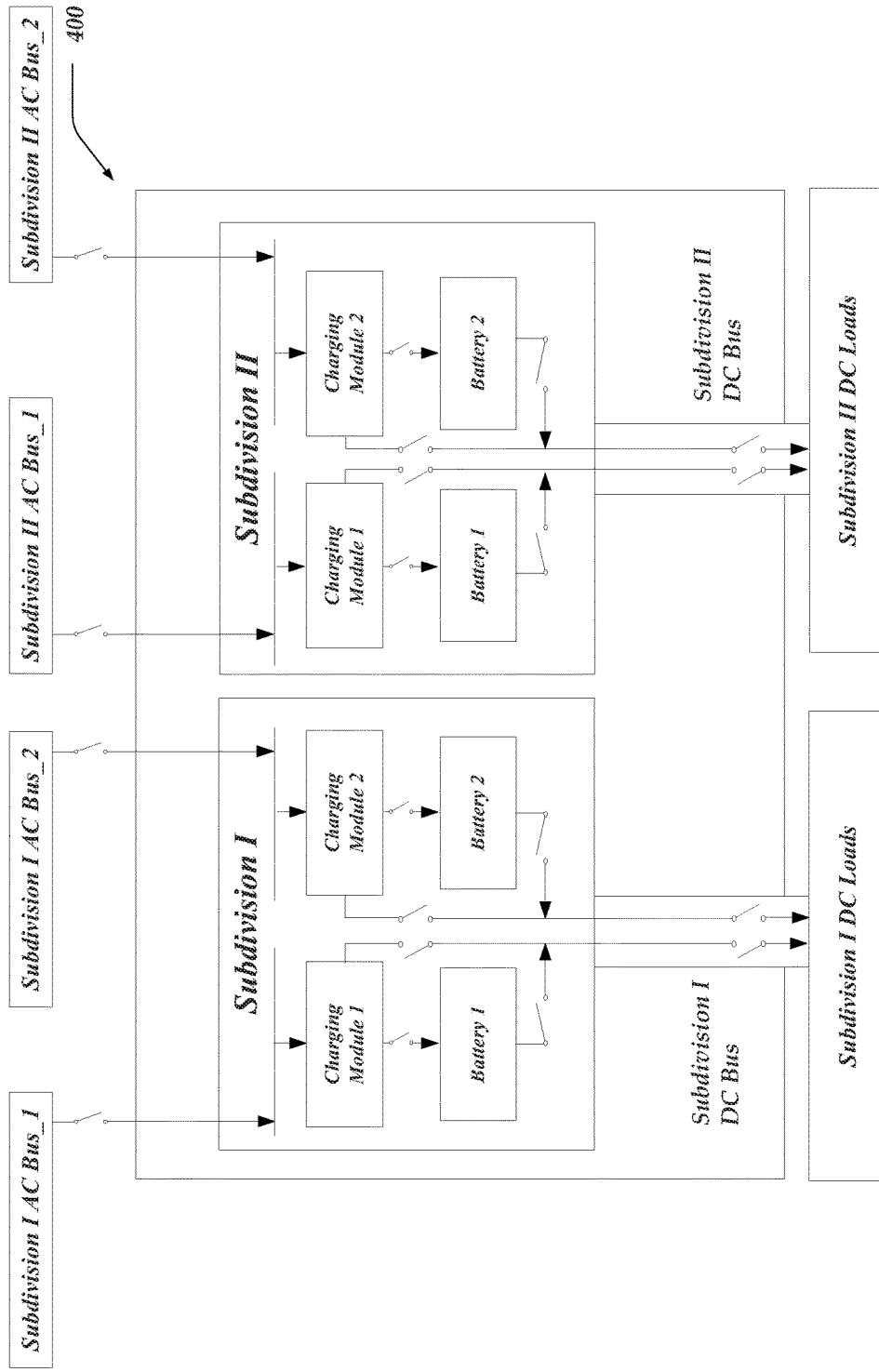
FIG. 4A shows a schematic view of an embodiment of a fault-tolerant common plant power-distribution module.

FIG. 4A shows a schematic view of an embodiment of a fault-tolerant common plant power-distribution module. Common plant PDM 400 provides a DC power signal to a plurality of loads that are common to a plurality of PGM and associated with and/or assigned to common plant PDM 400. Various embodiments of common plant PDM 400 may include similar features and/or structures to module-specific PDM 300 of FIGS. 3A-3B. For instance, similar to module-specific PDM 300, common plant PDM 400 includes two subdivisions: Subdivision I and Subdivision II. Subdivision I and Subdivision II of common plant PDM 400 may be equivalent and/or redundant subdivisions.

As discussed further below, each of the subdivisions may include at least two redundant batteries, at least two redundant battery charging modules, and a DC bus. Each of the common plant loads associated with and/or assigned to common plant PDM 400 are served by exactly one of Subdivision I or Subdivision II. Thus, Subdivision I and Subdivision II are redundant subdivisions of common plant PDM 400.

Under normal power plant operations, such as when at least one of the PGMs is generating power, the common plant PDM 400 receives an AC power signal that is generated from within the power plant. Common plant PDM 400 outputs a DC power signal that includes energy from the received AC power signal. The voltage of the AC power signal may be greater than the voltage of the outputted DC power signal. For instance, the voltage of the inputted AC power signal may be approximately 480 V AC. The voltage of the outputted DC signal may be approximately 125 V DC. Common plant PDM 400 provides the outputted DC power signal to the associated and/or assigned common plant loads, while charging and/or maintaining the float voltage on the redundant batteries.

In the event that the AC power signal is not being received (such as when the operation of the PGM that generated the AC signal is shutdown), at least one of the batteries included in the common plant PDM 400 outputs that DC power signal. The batteries may be enabled with sufficient capacity to supply the assigned plant loads for a predefined duty cycles, such as 24 or 72 hours. Each of the two redundant batteries included in each subdivision may be enabled to carry the full load assigned to common plant PDM 400. In some embodiments, the first battery included in a subdivision may be enabled to fully supply the load for at least 72 hours and the second battery may be enabled to fully supply the load for at least 72 hours.

As described below, common plant PDM 400 includes such redundancy that any component included in common PDM 400 may be removed from service (such as for maintenance operations), or experience a fault-condition without loss of functionality of common plant PDM 400.

More specifically, one or more AC power signals are provided to common plant PDM 400 via one or more AC busses, which may include one or more AC power busses. In the embodiment shown in FIG. 4A, Subdivision I AC Bus may provide Subdivision I one or more AC power signals to Subdivision I of PDM 400. Similarly, Subdivision II AC Bus provides one or more AC power signals to Subdivision II of PDM 400. Local distribution bus 184 of FIGS. 1B-1C may include Subdivision I AC Bus and Subdivision II AC Bus, as shown in FIG. 4A. The AC power signals may be generated in the power plant, such as by one or more PGM assembly and generator pairs. Thus, PDM 400 includes a plurality of AC inputs. A local distribution bus of the power plant provides one or more AC signals to the plurality of AC inputs.

Accordingly, each of Subdivision I AC Bus_1 and Subdivision AC Bus_2 may be selectively coupled to corresponding Subdivision I of PDM 400. Each of Subdivision II AC Bus_1 and Subdivision II AC_Bus_2 may be selectively coupled to corresponding Subdivision II of PDM 400. Thus, the AC power signals may be selectively provided to each of the corresponding subdivisions via the couplings. Switches between each of the subdivision AC busses and the corresponding subdivisions may be employed to couple and decouple the AC bus to the corresponding subdivision to selectively provide the AC power signal to the corresponding subdivision.

Common plant PDM 400 includes one or more DC busses corresponding to each of the two subdivisions. The plurality of DC busses may include one or more DC power busses. As described herein, each of the subdivisions may selectively provide a DC power signal to one or more corresponding DC busses. As shown in FIG. 4A, Subdivision I provides a DC power signal to corresponding Subdivision I DC Bus. Likewise, Subdivision II provides a DC power signal to corresponding Subdivision II DC Bus. The DC power busses may provide the DC signals to the various plant loads associated with and/or assigned to common plant PDM 400. Each of Subdivision I DC Bus and Subdivision II DC Bus may be enabled to independently supply the corresponding DC power signal to each of the corresponding common plant loads associated with common plant PDM 400. For instance, Subdivision I DC Bus supplies DC power to each of the Subdivision I loads and Subdivision II DC Bus supplies DC power to each of the Subdivision II loads.

In various embodiments, each of the subdivisions includes at least two redundant batteries, which are shown as Battery 1 and Battery 2 in each of Subdivision I and Subdivision II. In some embodiments, at least one of the batteries may be a valve-regulated lead-acid (VRLA) battery. Furthermore, each subdivision includes two charging modules: Charging Module 1 and Charging Module 2. Charging Module 1 may charge Battery 1 and maintain a battery float voltage on Battery 1. Likewise, Charging Module 2 may charge Battery 2 and maintain a battery flow voltage on Battery 2.

As shown in FIG. 4A, switches between the AC bus and each of the subdivision selectively couple and decouple the AC busses to each of the corresponding redundant battery/charging module pairs included in the corresponding subdivision. Accordingly, an AC power signal may be selectively provided to either one or both of the battery/charging module pairs in each of the two subdivisions.

Also shown in FIG. 4A, the AC power signal may be selectively provided to at least one of the charging modules included in a subdivision. Each of the charging modules include one or more rectifiers that rectify the provided AC power signal and output a DC power signal that includes a rectified portion of the AC power signal. In various embodiments, the one or more rectifiers may include one or more rectifier bridges.

The voltage of the inputted AC signal may be different from the voltage of the outputted DC power signal. One or more of the charging modules may include one or more transformers to transform the voltage of at least the inputted AC power signal. In at least one of the embodiments, at least one of the charging modules includes one or more DC-to-DC converters to convert the voltage of the outputted DC power signal. In at least one embodiment, the voltage of the inputted AC power signal is approximately 480 V AC. The voltage of the outputted DC power signal may be approximately 125 V DC.

Each of the charging modules may selectively provide at least a portion of the outputted DC power signal to the corresponding subdivision's DC loads via the corresponding subdivision DC bus. As shown in FIG. 4A, Subdivision I DC Bus provides a DC signal from Subdivision I to Subdivision I DC Loads. Similarly, Subdivision II DC Bus provides a DC signal from Subdivision II to Subdivision II DC Loads. Thus, the corresponding subdivision DC bus provides the DC power signal to the plurality of loads assigned to the common plant PDM 400. The switches between the DC busses and each of the charging modules may be employed to couple and decouple the subdivision DC bus to each of the charging modules or each of the batteries (included in the corresponding subdivision) to selectively provide the DC power signal to the corresponding subdivision DC bus.

At least another portion of the outputted DC power signal may be selectively provided to the corresponding battery to charge and/or maintain the battery float voltage on the corresponding battery. As shown, switches between the charging module and the corresponding battery may be used to selectively couple and decouple the charging module to the battery. In at least one embodiment, the voltage of the DC power signal provided to the battery may be greater than the voltage of the DC power signal provided to the DC bus to charge and maintain the float voltage on the battery. Thus, separate DC-to-DC converters may be employed in the charging module to generate DC power signals with different voltages.

When the AC bus provides the AC power signal to the corresponding subdivision, such as when a PGM assembly and generator pair is generating the received AC power signal, at least one of the rectifiers included in a subdivision provides the DC signal to the subdivision DC bus that corresponds to the subdivision. When the AC bus does not provide the AC power signal to the channel, such as when a PGM assembly is shutdown, at least one of the batteries included in the subdivision provides the DC signal to the subdivision DC bus that corresponds to the subdivision. The switches between the batteries and corresponding subdivision DC bus may be used to selectively couple and decouple the batteries from the corresponding subdivision DC bus.

Because each of Subdivision I is enabled to provide a DC power signal to each of the Subdivision I DC Loads and Subdivision II is enabled to provide a DC power signal to each of Subdivision II DC Loads, Subdivision I and Subdivision II are redundant subdivisions. Accordingly, common plant PDM 400 is a fault-tolerant PDM. Also, note that each subdivision includes redundant batteries and redundant charging modules. In at least one embodiment, the first battery in each subdivision is enabled to provide the DC power signal, at full capacity, to the corresponding subdivision DC bus for at least 72 hours. In some embodiments, the second battery in each channel is enabled to provide the DC power signal, at full capacity, to the corresponding subdivision DC bus for at least 72 hours. The voltage of the DC power signal provided, via a battery, to the DC bus may be equivalent to the voltage of the DC power signal provided, via the charging modules, to the DC bus. Thus, each of the batteries may be approximately 125 V DC batteries.

As discussed throughout, each of the subdivisions includes two redundant battery/charging module pairs: a first battery/charging module pair includes Battery 1 and Charging Module 1 and a second battery/charging module pair includes Battery 2 and Charging Module 2. For a particular subdivision to provide the DC power signal to the DC bus, only one of the battery or the charging module of one of the two battery/charging module pairs of the subdivision is required as operative. Thus components may be removed (for maintenance), while the other battery/charging module pair in the channel remains operative. Each of the redundant battery/charging pairs may be a separate and/or independent sub-system.

Figure 4B:
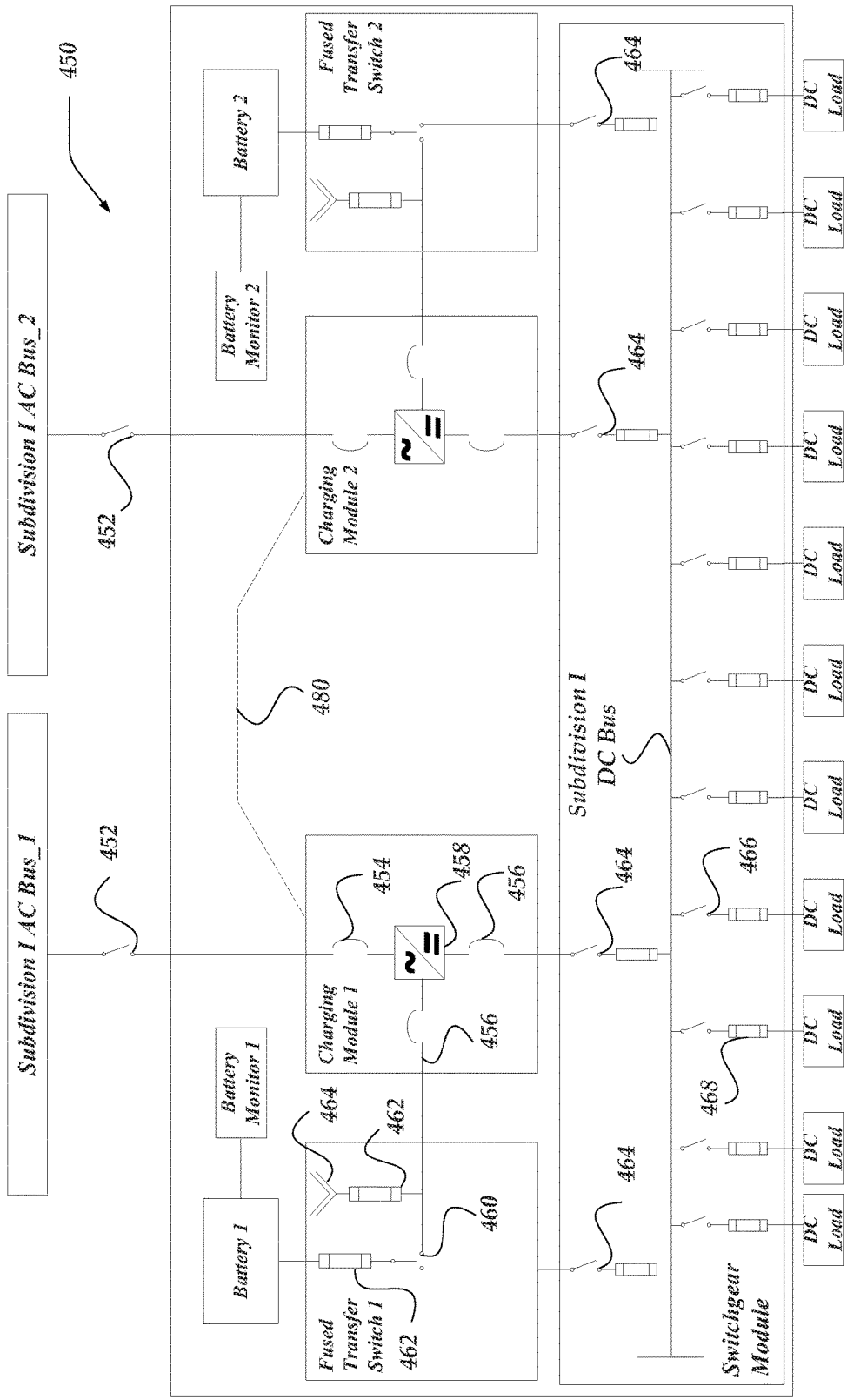
FIG. 4B shows a one-line schematic diagram for Subdivision I of the common plant power-distribution module of FIG. 4A.

FIG. 4B shows a one-line schematic diagram for Subdivision I 450 of the common plant PDM 400 of FIG. 4A. Subdivision II of PDM 400 may include similar features and/or structures to Subdivision I 450. Subdivision I 450 includes two redundant battering/charging module pairs. The first battery/charging module pair includes Charging Module 1, Fused Transfer Switch Module 1, Battery 1, and Battery Monitor 1. The second battery/charging module pair includes Charging Module 2, Fused Transfer Switch Module 2, Battery 2, and Battery Monitor 2.

Subdivision I AC Bus_1 selectively provides an AC power signal to the charging module in the first battery/charging module pair of Subdivision I. Subdivision I AC Bus_2 selectively provides an AC power signal to the charging module in the second battery/charging module pair of Subdivision I. Subdivision II AC Bus_1 selectively provides an AC power signal to the charging module in the first battery/charging module pair of Subdivision II. Subdivision II AC Bus_2 selectively provides an AC power signal to the charging module in the second battery/charging module pair of Subdivision II. The voltage of the provided AC signal may be approximately 480 V AC. One or more switches 452 may be employed to selectively couple Subdivision I AC Bus_1 and Subdivision I AC Bus_2 the corresponding battery/charging module pair included in Subdivision I 450. As shown in FIG. 4B, in some embodiments, switches 452 may be outside of the PDM that includes Subdivision I 450. In other embodiments, switches 452 may be included in the PDM.

As shown in FIG. 4B, a fused transfer switch module in a battery/charging module pair may selectively couple and decouple each of the batteries to the to the Subdivision I DC bus included in the switchgear module. A fused transfer switch module may include a changeover switch 460, one or more fuses 462, and a battery test terminal. Changeover switch 460 may be a double pole changeover switch (DPCO).

The charging modules include one or more circuit breakers to provide protection from an over-voltage, under-voltage, or over-current event. For instance, charging modules may include AC supply breaker 454 and DC output breakers 456. The charging modules may also include one or more rectifiers 458 to rectify the provided AC power signal. Rectifier 458 may include one or more transformers or DC-to-DC converters to output a DC power signal at a voltage that is approximately 125 V DC, or at least less than the voltage of the inputted AC signal.

In various embodiments, the charging modules include an indicator that indicates at least one charger output current, voltage, alarms for open DC output circuit breaker, DC output failure, AC supply failure, low and high DC output voltage, charger overload, and ground detection. The charging modules may include relays for high DC voltage shutdown events. Other components included in the charging modules may include transformers, DC-to-DC converters, relays, and other components discussed throughout.

Each battery/charging module pair may include one or more separate battery monitors. A battery monitor may include one or more indicators that indicate a battery current and/or voltage. A battery monitor may also include one or more alarms for battery overvoltage, under-voltage, and high or low room temperature. In some embodiments, each of the batteries may include multiple battery cells. For instance, a battery may include at least 60 cells.

In various embodiments, a communication link may be included between the redundant charging modules in each of the Subdivision I and Subdivision II. A communication link between charging modules may enable the two charging modules to share providing DC power to a single DC bus. Accordingly, in the various embodiments, multiple charging modules are enabled to share in the supplying DC power to the various DC bus loads. For instance, in FIG. 4B, communication link 480 is included between Charging Module 1 and Charging Module 2 for Subdivision I. Communication link 480 may include load sharing circuity to enable Charging Module 1 and Charging Module 2 to share providing DC power to the DC bus for Subdivision I. It should also be noted that Charging Module 1 of Subdivision I is enabled to charge Battery 1 while simultaneously providing DC power to the DC bus for Subdivision I. Furthermore, Charging Module 2 of Subdivision I is enabled to charge Battery 2 while simultaneously providing DC power to the DC bus for Subdivision I.

At least a portion of the DC bus for Subdivision I 450 may be included in a switchgear module. For instance, the switchgear module may include Subdivision I DC bus. As shown, a plurality of switches 464 may selectively couple the charging modules and the batteries (via fused transfer switch modules) to the DC bus.

Switchgear module may include another plurality of switches, such as switch 366 that selectively couples the DC bus to each of the DC loads associated with and/or assigned to Subdivision I. Switchgear module may include a plurality of circuit breakers, switches, and/or fuses, such as but not limited to fusible disconnect switch 468, to protect the various DC loads from an over voltage and/or over current event. In various embodiments, at least one of the plurality of switches included in the switchgear module may be a double-pole single-throw (DPST) switch. The switchgear module may also include one or more alarms to indicate a change of a switch or breaker status.

The plurality of DC loads may include, but are not otherwise limited to radiation monitors, sensors, motors, actuators, valves, computers, loads associated with the control room, or any loads required to start and operate a PGM assembly, such PGM assembly 100 of FIG. 1A. It should be noted that in some embodiments, power is not required to safely shutdown the power plant.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A fault-tolerant power-distribution module (PDM) comprising:
    a plurality of inputs from a plurality of alternating current (AC) busses of a power plant that provide an AC signal to the PDM;
    a first direct current (DC) bus that is directly coupled to a first group of loads that is specific to only a single power generation module (PGM) among a plurality of PGMs of the power plant, wherein the single PGM comprises a modular nuclear reactor that generates a portion of the AC signal;
    a second DC bus that is directly coupled to a second group of loads that is specific to only the single PGM, the first group of loads and the second group of loads configured to operate the modular nuclear reactor;
    a first channel, wherein when a first one of the plurality of AC busses provides the AC signal to the first channel, a first rectifier rectifies the AC signal and selectively provides a first DC signal to the first DC bus, wherein the first DC signal includes a first portion of the rectified AC signal, and when the plurality of AC busses do not provide the AC signal to the first channel, a first battery selectively provides the first DC signal to the first DC bus and the first DC signal includes energy stored in the first battery; and
    a second channel, wherein when a second one of the plurality of AC busses provide the AC signal to the second channel, a second rectifier rectifies the AC signal and selectively provides a second DC signal to the second DC bus, wherein the second DC signal includes a second portion of the rectified AC signal, and when the plurality of AC busses do not provide the AC signal to the second channel, a second battery selectively provides the second DC signal to the second DC bus and the second DC signal includes energy stored in the second battery.

2. The PDM of claim 1, further comprising
    a third DC bus that is coupled to the first group of loads;
    a fourth DC bus that is coupled to the second group of loads;
    a third channel, wherein when a third one of the plurality of AC busses provides the AC signal to the third channel, a third rectifier rectifies the AC signal and selectively provides a third DC signal to the third DC bus, wherein the third DC signal includes a third portion of the rectified AC signal, and when the plurality of AC busses do not provide the AC signal to the third channel, a third battery selectively provides the third DC signal to the third DC bus and the third DC signal includes energy stored in the third battery; and
    a fourth channel, wherein when a fourth one of the plurality of AC busses provide the AC signal to the fourth channel, a fourth rectifier rectifies the AC signal and selectively provides a fourth DC signal to the fourth DC bus, wherein the fourth DC signal includes a fourth portion of the rectified AC signal, and when the plurality of AC busses do not provide the AC signal to the fourth channel, a fourth battery selectively provides the fourth DC signal to the fourth DC bus and the fourth DC signal includes energy stored in the fourth battery.

3. The PDM of claim 1, wherein
    when a third one of the plurality of AC busses provides the AC signal to the first channel, a third rectifier rectifies the AC signal and selectively provides a third DC signal to the first DC bus, wherein the third DC signal includes a third rectified portion of the AC signal, and when a third one of the plurality of AC busses does not provide the AC signal to the first channel, a third battery selectively provides the third DC signal to the first DC bus and the third DC signal includes energy stored in the third battery; and
    when a fourth one of the plurality of AC busses provide the AC signal to the second channel, a fourth rectifier rectifies the AC signal and selectively provides a fourth DC signal to the second DC bus, wherein the fourth DC signal includes a fourth portion of the rectified AC signal, and when a fourth one of the plurality of AC busses does not provide the AC signal to the second channel, a fourth battery selectively provides the fourth DC signal to the second DC bus and the fourth DC signal includes energy stored in the fourth battery.

4. The PDM of claim 3, wherein a capacity of the first battery enables the first battery to provide the first DC signal to the first group of loads for at least 24 hours, a capacity of the second battery enables the second battery to provide the second DC signal to the second group of loads for at least 24 hours, a capacity of the third battery enables the third battery to provide the third DC signal to first group of loads at least 72 hours, and a capacity of the fourth battery enables the fourth battery to provide the fourth DC signal to the second group of loads for at least 72 hours.

5. The PDM of claim 1, wherein
    the first channel includes a first battery charger, wherein when the first one of the plurality of AC busses provide the AC signal to the first channel, the first battery charger selectively charges the first battery and maintains a float voltage on the first battery; and
    the second channel includes a second battery charger, wherein when the second one of the plurality of AC busses provide the AC signal to the second channel, the second battery charger selectively charges the second battery and maintains the float voltage on the second battery.

6. The PDM of claim 1, further comprising:
a first switch that selectively couples the first DC bus and the first battery; and
a second switch that selectively couples the second DC bus and the second battery.

7. The PDM of claim 1, wherein at least a portion of each of the first and the second DC busses is included in one or more switchgear modules.

8. A fault-tolerant system for locally providing electrical power generated in a power plant to the power plant, the system comprising:
a plurality of alternating current (AC) inputs that are each enabled to receive an AC signal;
a first channel that includes:
a first sub-system that, in response to receiving the AC signal from a first one of the plurality of AC inputs, generates a first direct current (DC) signal;
a second sub-system that, in response to receiving the AC signal from a second one of the plurality of AC inputs, generates a second DC signal; and
a first DC bus that in response to receiving at least one of the first or the second DC signals from the first or the second sub-systems, provides the received first or the second DC signals to a first subset of loads that is specific to only a single power generation module (PGM) among a plurality PGMs of the power plant, wherein the single PGM comprises a modular nuclear reactor that generates a portion of the AC signal; and
a second channel that includes:
a third sub-system that, in response to receiving the AC signal from a third one of the plurality of AC inputs, generates a third DC signal;
a fourth sub-system that, in response to receiving the AC signal from a fourth one of the plurality of AC inputs, generates a fourth DC signal; and
a second DC bus that, in response to receiving at least one of the third or the fourth DC signals from the third or the fourth sub-systems, provides the received third or the fourth DC signals to the first subset of the loads that is specific to only the single PGM among the plurality of PGMs of the power plant, wherein the first subset of the loads that receives DC power from the first DC bus and the second DC bus is configured to operate the modular nuclear reactor.

9. The system of claim 8, further comprising: a third channel that includes:
a fifth sub-system that, in response to receiving the AC signal from a fifth one of the plurality of AC inputs, generates a fifth DC signal; a sixth sub-system that, in response to receiving the AC signal from a sixth one of the plurality of AC inputs, generates a sixth DC signal; and a third DC bus that in response to receiving at least one of the fifth or the sixth DC signals from the fifth or the sixth sub-systems, provides the received fifth or the sixth DC signals to a second subset of the loads that is specific to only the single PGM among the plurality of PGMs of the power plant; and a fourth channel that includes:
a seventh sub-system that, in response to receiving the AC signal from a seventh one of the plurality of AC inputs, generates a seventh DC signal; an eighth sub-system that, in response to receiving the AC signal from an eighth one of the AC inputs, generates an eighth DC signal; and a fourth DC bus that, in response to receiving at least one of the seventh or the eighth DC signals from the seventh or the eighth sub-systems, provides the
received seventh or the eighth DC signals to the second subset of the loads that is specific to only the single PGM among the plurality of PGMs of the power plant.

10. The system of claim 8, wherein the first sub-system of the first channel includes a first battery and a first charging module and the second sub-system of the first channel includes a second battery and a second charging module, such that
in response to the first sub-system receiving the AC signal from the first one of the plurality of AC inputs, the first charging module generates the first DC signal by converting at least a portion of the AC signal to the first DC signal, employs a portion of the first DC signal to charge and maintain a float voltage on the first battery, and provides another portion of the first DC signal to the first DC bus; and
in response to the second sub-system receiving the AC signal from the second one of the plurality of AC inputs, the second charging module generates the second DC signal by converting at least a portion of the AC signal to the second DC signal, employs a portion of the second DC signal to charge and maintain a float voltage on the second battery, and provides another portion of the second DC signal to the first DC bus.

11. The system of claim 8, wherein the first sub-system of the first channel includes a first battery and a first charging module and the second sub-system of the first channel includes a second battery and a second charging module, such that
in response to the first sub-system not receiving the AC signal from the first one of the plurality of AC inputs, the first battery selectively generates the first DC signal and selectively provides the first DC signal to the first DC bus; and
in response to the second sub-system not receiving the AC signal from the second one of the plurality of AC inputs, the second battery selectively generates the second DC signal and selectively provides the second DC signal to the first DC bus.

12. The system of claim 8, wherein the first sub-system of the first channel includes a first battery, a first charging module, and a first switch that selectively couples and decouples the first DC bus and the first battery and the second sub-system of the first channel includes a second battery, a second charging module, and a second switch that selectively couples and decouples the first DC bus and the second battery.

13. The system of claim 8, wherein a voltage of the AC signal is approximately 480 V AC and a voltage of the first and the second DC signals is approximately 125 V.

14. The system of claim 8, wherein the AC signal is generated from heat generated by the modular nuclear reactor.

* * * * *